US008615157B1

(12) United States Patent
Isaacson et al.

(10) Patent No.: US 8,615,157 B1
(45) Date of Patent: Dec. 24, 2013

(54) SYSTEM AND METHOD FOR ON-DEMAND STORAGE OF RANDOMLY SELECTED DATA

(76) Inventors: David C. Isaacson, Columbia, MD (US); Diana L. Fitzgerald, Coral Gables, FL (US)

(*) Notice: Subject to any disclaimer, the term of this patent is extended or adjusted under 35 U.S.C. 154(b) by 1616 days.

(21) Appl. No.: 11/128,324

(22) Filed: May 13, 2005

Related U.S. Application Data

(63) Continuation-in-part of application No. 10/713,143, filed on Nov. 17, 2003.

(60) Provisional application No. 60/571,918, filed on May 18, 2004.

(51) Int. Cl.
*H04N 9/80* (2006.01)
*G11B 27/10* (2006.01)

(52) U.S. Cl.
CPC .................................. G11B 27/105 (2013.01)
USPC ............. 386/241; 725/50; 715/748; 705/26.1

(58) Field of Classification Search
CPC ...................................................... G11B 27/105
USPC ............. 84/601, 602, 641; 705/26; 455/3.02, 455/3.06; 386/200, 231, 234, 239–241, 386/248, 298; 360/5; 369/7; 715/748; 725/50
See application file for complete search history.

(56) References Cited

U.S. PATENT DOCUMENTS

| 4,430,676 A | 2/1984 | Johnson |
| 4,499,601 A | 2/1985 | Matthews |
| 4,682,370 A | 7/1987 | Matthews |
| 4,788,675 A | 11/1988 | Jones et al. |
| 5,262,940 A | 11/1993 | Sussman |
| 5,345,430 A * | 9/1994 | Moe .................................. 369/7 |
| 5,371,532 A | 12/1994 | Gelman et al. |
| 5,399,799 A | 3/1995 | Gabriel |
| 5,490,125 A | 2/1996 | Takada et al. |
| 5,661,787 A | 8/1997 | Pocock |
| 5,703,795 A | 12/1997 | Mankovitz |
| 5,732,324 A | 3/1998 | Rieger, III |

(Continued)

OTHER PUBLICATIONS

Audiovox—Sirius Shuttle User Guide SIR-PNP2, Oct. 2003.

(Continued)

*Primary Examiner* — Daquan Zhao
*Assistant Examiner* — Mishawn Dunn
(74) *Attorney, Agent, or Firm* — David C. Isaacson

(57) ABSTRACT

A data storage system allows a subscriber to store data at the time the subscriber experiences the date with an indication, such as a press of a button or a voice command. The indication causes a request to obtain and store the data to be issued. For example, the subscriber can store music while listening to it, store or request movies while viewing them, or store movie soundtracks while viewing movies. The entire music file can be stored, for example, in a vehicle in which the subscriber is traveling. For some environments, such as storage in a cellular telephone, a portion of the music is stored in a format compatible for that environment, such as cellular telephone ring tone format. When the indication is received, a determination is made as to which music is required, generally by determining the time of the indication. The music heard by the listener is then downloaded for storage in accordance with the subscriber's request. Movies, songs or soundtracks can be stored when they are viewed or heard, for example, while in a movie theater.

19 Claims, 16 Drawing Sheets

(56) References Cited

U.S. PATENT DOCUMENTS

| | | | |
|---|---|---|---|
| 5,742,893 | A | 4/1998 | Frank |
| 5,809,246 | A | 9/1998 | Goldman |
| 5,862,104 | A | 1/1999 | Matsumoto |
| 5,907,815 | A | 5/1999 | Grimm et al. |
| 5,931,901 | A | 8/1999 | Wolfe et al. |
| 5,949,492 | A | 9/1999 | Mankovitz |
| 6,041,023 | A | 3/2000 | Lakhansingh |
| 6,067,278 | A | 5/2000 | Owens et al. |
| 6,072,645 | A * | 6/2000 | Sprague .............. 360/5 |
| 6,163,508 | A | 12/2000 | Kim |
| 6,192,372 | B1 | 2/2001 | Yamaura et al. |
| 6,209,787 | B1 * | 4/2001 | Iida .............. 235/381 |
| 6,233,389 | B1 | 5/2001 | Barton et al. |
| 6,233,682 | B1 | 5/2001 | Fristch |
| 6,246,672 | B1 | 6/2001 | Lumelsky |
| 6,247,130 | B1 | 6/2001 | Fristch |
| 6,263,147 | B1 * | 7/2001 | Tognazzini ............ 386/298 |
| 6,434,535 | B1 | 8/2002 | Kupka et al. |
| 6,437,227 | B1 | 8/2002 | Theimer |
| 6,516,466 | B1 | 2/2003 | Jackson |
| 6,529,584 | B1 | 3/2003 | Ravago et al. |
| 6,567,359 | B2 | 5/2003 | MacPherson et al. |
| 6,587,127 | B1 | 7/2003 | Leeke et al. |
| 6,587,837 | B1 | 7/2003 | Spagna et al. |
| 6,625,444 | B1 | 9/2003 | Fleming, III et al. |
| 6,640,145 | B2 | 10/2003 | Hoffberg et al. |
| 6,674,960 | B2 | 1/2004 | Duran et al. |
| 6,678,215 | B1 | 1/2004 | Treyz et al. |
| 6,701,355 | B1 | 3/2004 | Brandt et al. |
| 6,757,913 | B2 | 6/2004 | Knox |
| 6,937,732 | B2 | 8/2005 | Ohmura et al. |
| 6,941,275 | B1 * | 9/2005 | Swierczek ............ 705/26 |
| 6,959,419 | B2 | 10/2005 | Tanikawa |
| 7,014,484 | B2 | 3/2006 | Hagiwara |
| 7,093,754 | B2 | 8/2006 | Sako |
| 7,113,739 | B2 * | 9/2006 | Kawamata et al. ......... 455/3.02 |
| 7,113,927 | B1 | 9/2006 | Tanaka et al. |
| 7,227,071 | B2 * | 6/2007 | Tagawa et al. ............ 84/601 |
| 7,233,658 | B2 | 6/2007 | Koser et al. |
| 7,257,536 | B1 * | 8/2007 | Finley et al. ............ 704/270 |
| 7,263,280 | B2 * | 8/2007 | Bullock et al. ............ 386/241 |
| 7,356,557 | B2 | 4/2008 | Kikuchi et al. |
| 7,424,446 | B2 * | 9/2008 | Emodi et al. ............ 705/26 |
| 7,444,353 | B1 * | 10/2008 | Chen et al. ............ 1/1 |
| 7,450,971 | B2 * | 11/2008 | Futohashi ............ 455/567 |
| 2001/0000808 | A1 | 5/2001 | Lesley |
| 2002/0007354 | A1 * | 1/2002 | Deguchi ............ 705/418 |
| 2002/0074413 | A1 | 6/2002 | Henzerling |
| 2002/0174431 | A1 * | 11/2002 | Bowman et al. ............ 725/47 |
| 2002/0198789 | A1 * | 12/2002 | Waldman ............ 705/26 |
| 2003/0037124 | A1 | 2/2003 | Yamaura et al. |
| 2003/0044021 | A1 * | 3/2003 | Wilkinson et al. ............ 381/56 |
| 2004/0011190 | A1 | 1/2004 | Kawashima |
| 2004/0086120 | A1 * | 5/2004 | Akins et al. ............ 380/240 |
| 2004/0203406 | A1 * | 10/2004 | Moran et al. ............ 455/66.1 |
| 2005/0031314 | A1 | 2/2005 | Galdos |
| 2005/0219068 | A1 * | 10/2005 | Jones et al. ............ 341/50 |
| 2006/0003753 | A1 * | 1/2006 | Baxter, Jr. ............ 455/414.3 |
| 2006/0259375 | A1 * | 11/2006 | Deguchi ............ 705/27 |
| 2007/0043847 | A1 | 2/2007 | Carter et al. |
| 2007/0177586 | A1 | 8/2007 | Eyal et al. |
| 2008/0060504 | A1 | 3/2008 | Oshiyama et al. |

OTHER PUBLICATIONS www.audiovox.com/pressrelease/AEC/release_AEC_2004010922.html, "Audiovox Car and Home Sirius Satellite Radio System Scores Big with Retailers and Consumers", Jan. 9, 2004.
www.ericsson.com/ericsson/press/releases/old/archive/2000Q2/20000605-0007.html, "Ericsson Unveils First GPRS Phone with Bluetooth(tm)—the R520," Jun. 5, 2000.
Markoff, John, www.nytimes.com/library/tech/98/12/biztech/articles/21time.html, "FCC Mulss Wider Commercial Use of Radical Radio Technology," Dec. 21, 1998.
Dorman, Andy, "Emerging Technology" Are We Better Off Without 3G?, Jun. 3, 2003.
Kong, Rich, et al., "Mobile Data Access: Disconnected and Partially Connected Approaches," Mar. 5, 2001.
Reilly, Darrin, www.motorola.com/LMPS/articles/polchiefhtml, "Making the Choice Among Private, Public or Integrated Networks for . . . Data Communications," Sep. 1997.
Layer, David, "Digital Radio Takes to the Road," *IEEE Spectrum*, pp. 40-46, Jul. 2001.
Mitola, Joe, "The Software Radio Architecture," *IEEE Communications Magazine*, pp. 26-38, May 1995.
Product Review, "Sony MEX-1HD," T3 issue 80, Christmas 2002.
Product Advertisement, Delphi SA 10000 XM SKYFi Radio Receiver, copyright 2003.
Product Advertisement, Echo Mobile Music, Music Keeper(TM).
Mossberg, Walter S., "Attack of the iPod Clones," The Wall Street Journal, pp. D1 and D4, Oct. 29, 2003.
Griffin Technology RadioShark product manual, May 2004.
Tivo Viewer's Guide, Nov. 2002.

* cited by examiner

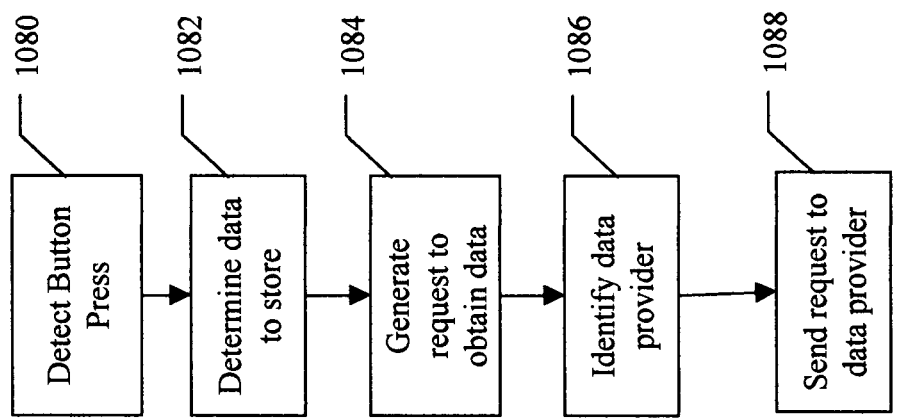

SYSTEM AND METHOD FOR ON-DEMAND STORAGE OF RANDOMLY SELECTED DATA

The present application is a continuation-in-part of U.S. patent application Ser. No. 10/713,143, filed on Nov. 17, 2003, which is hereby incorporated by reference in its entirety. The present application further claims the benefit of U.S. Provisional Appln. No. 60/571,918, filed May 18, 2004, which is hereby incorporated by reference in its entirety.

BACKGROUND OF THE INVENTION

1. Field of the Invention

Embodiments of the present invention relate generally to recording data, such as music or movies. More specifically, embodiments of the present invention relate to storing the data at the time a subscriber experiences it, such as while listening to a car radio or while watching a movie at a movie theater.

2. Background

There are numerous times when one sees or hears something that he or she would like to store for future use. For example, while driving a car, one may hear a song playing on the car radio that he or she would like to record for future listening. Similarly, in a movie theater, one may hear a song or see a movie that he or she would like to store for future listening or viewing. However, in these and many other circumstances such storage is inconvenient or impossible. For example, in the case of driving a car, systems for recording the music are rare, and to the extent that they exist, they have a significant drawback. That drawback is that the song is not stored from its beginning. Rather, the song is only stored from the time that the subscriber indicates that he or she desires that it be recorded. This is undesirable because the whole song is not recorded. Similarly in a movie theater, there is no way to store the song or soundtrack of the movie at the time it is heard. There are numerous other examples where a person may desire to store data he or she is experiencing, for example, a song playing on the radio, a movie soundtrack, a song in the soundtrack or the movie itself while viewing a movie.

In addition to recording music, people also often desire to store the music in different formats. For example, a person may hear a song on the radio and desire to store the song as a ring tone for a telephone such as a cellular telephone. Conventional systems allow cellular telephone subscribers to select and upload to their cellular telephones various pre-recorded ring tones. Conventional systems further allow cellular telephone subscribers to create or generate their own ring tones. However, such systems do not allow subscribers to store a song that they are currently listening to as a ring-tone or in some other format.

SUMMARY OF THE INVENTION

The present invention provides subscribers with the ability to store music, and other data, at the time they experience it. For example, music can be stored when it is heard, such as while driving in a car. In addition, movies and/or movie soundtracks can be stored or requested while sitting in a movie theater.

In one embodiment, the present invention is a system for storing music. The system includes a device for playing music that is heard by a subscriber. When the subscriber hears music that he or she desires to store, the subscriber requests such storage. A request is generated in response to a subscriber request to store music. A transmitter in the system transmits the generated request to obtain the music for storage. A music database is queried to obtain music responsive to the subscriber's request. The music is sent to a storage device that receives and stores the music.

In another embodiment, the present invention is a method for storing randomly selected music on demand. The method includes receiving an indication from a subscriber to store music to which the subscriber is listening. The method continues with the steps of generating and transmitting a request to obtain the desired music from a music storage database. The method continues with the step of transmitting a file comprising the music desired to be stored for storage in response to the request. The method then continues with the step of storing the music.

In another embodiment, the present invention is a system for storing one or more of a movie, song in a movie or a movie soundtrack. The system includes a seat in a movie theater having a card reader to read a credit card or other card provided by a subscriber. The system includes a first computer coupled to the card reader to obtain information from the card and to determine an identity of the movie, song and/or movie soundtrack. A second computer coupled to the first computer obtains the information from the first computer. The system also includes a database that has data corresponding to one or more movies, songs in the movies and movie soundtracks that is queried by the second computer and provides data corresponding to the identified movie, song, or movie soundtrack to the second computer in response to the query. A destination computer receives the data from the computer and a storage device stores the data received from the database.

BRIEF DESCRIPTION OF THE DRAWINGS

FIG. 10B is a flow chart for a method of storing data using a general device for storing data according to an embodiment of the present invention.

DETAILED DESCRIPTION OF THE INVENTION

Figure 1:
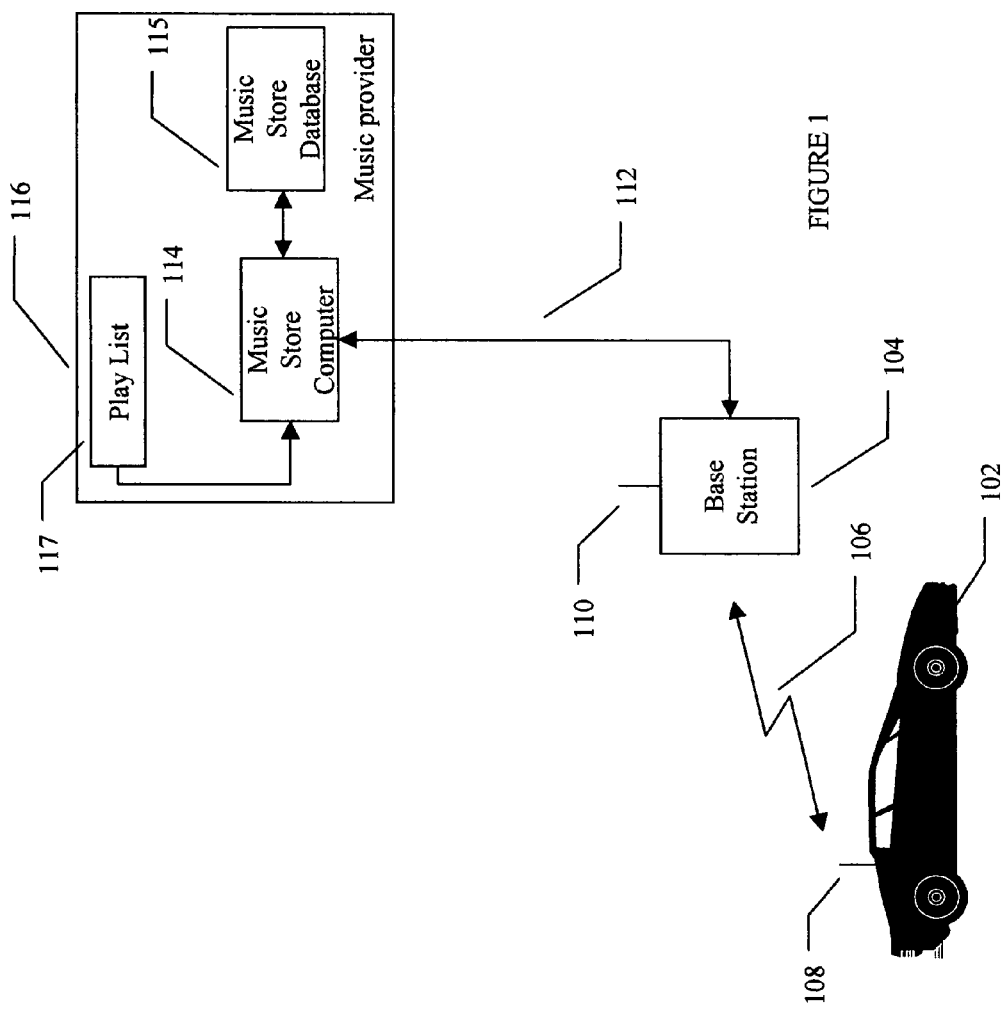
FIG. 1 is a schematic diagram of a system for storing music according to a first embodiment of the present invention.

FIG. 1 is a schematic diagram of a system for storing music according to a first embodiment of the present invention. A subscriber driving a car 102 hears music he or she desires to store. When the subscriber hears the music desired to be stored the subscriber indicates his or her desire to store the music. The indication is a request by the subscriber to store music he or she is listening to at the time that he or she is listening to it. The indication can be provided in numerous ways. For example, according to one embodiment of the present invention, the subscriber presses a button. In an alternative embodiment of the present invention, the indication is provided by a voice command. In another embodiment of the present invention, the indication is provided by sliding a credit card or other card through a card reader.

When the subscriber's indication is detected, a request is caused to be transmitted to a base station 104 over an air interface 106 through an antenna 108 on car 102. Base station 110 receives the request through an antenna 110. Methods for communicating the request from car 102 to base station 110 are well known to those skilled in the art. For example, in one embodiment of the present invention, base station 104 is a cell phone base station, in which the request is transmitted to the base station according to well-known cellular telephone protocols. In another embodiment of the present invention, base station 104 is a Wi-Fi hot spot, wherein the request is communicated using well-known 802.11b or 802.11g protocols. Other methods for communicating the request from car 102 to base station 104, such as Bluetooth technology, satellite or other communication systems, would be appreciated by those having skill in the art.

The request contains information required for carrying out the functions of the present invention. For example, the request can include the subscriber's name, or telephone number, subscription account number or any other information for uniquely identifying the subscriber. Using this information, the music provider can obtain other required information from an account that has been created for the subscriber. In addition, the request can obtain an identification of the music to store, the time the request was made or any other information required to carry out the functions of the present invention described herein. This information is used to access the music that will be sent to the subscriber for storage.

Base station 104 then transmits the request to a music store computer 114 in a music provider 116. Music provider 116 can be, for example, a radio station that plays songs heard by the subscriber or a third party provider. Music store computer 114 is coupled to a music store database 115. Music store database 115 stores music corresponding to the music that is heard by the subscriber. Music store computer 114 can be any computer that can be configured to operate in the manner described herein. Such computers, including for example, desktop computers and laptops, are well known and need not be described in detail further.

Music store computer 114 is configured to receive the request and determine what music the subscriber desires to store. The music the subscriber desires to store is the music being played by music provider 116 at or near the time the subscriber makes his or her request to store the music. For example, music store computer 114 can consult a play list 117 of music provider 116 to determine the song being played by music provider 116 at the time that the request is received or a time that is included in the request when transmitted.

Play list 117 is a list of songs provided (i.e., played) by music provider 116. In an embodiment of the present invention, play list 117 has a time slot associated with the songs listed therein. The time slot indicates the time of day the song is scheduled to be played by music provider 116. Music store computer 114 can consult a time slot of the play list to determine the song that was scheduled to be played at a particular time, and the song so scheduled as the song responsive to the subscriber's request.

In an alternative embodiment of the present invention, information about the song is transmitted in the request, which music store computer 114 can use to determine which song is being played. For example, the title of the song and artist can be transmitted in the request. Such information is provided in certain digital radios, for example, car radios that display the title and artist of a particular song being played. In another embodiment of the present invention, other identifying information is captured and sent in the request. For example, a song serial number or catalog number that is detected by a radio in the car that the user is listening to and provided in the request.

After determining the song that is being played, music store computer 114 uses that information to query a music store database 115. Music store database 115 stores complete versions of the songs corresponding to the music that music provider 116 provides. For example, where music provider 116 is a radio station, music store database 115 stores the music corresponding to the radio station's play list. In alternative embodiments of the present invention, music corresponding to the title and artist, or serial or catalog number provided in the request is obtained from music store database 115 and stored. The music in music store database 115 can be updated periodically as the music provided by music provider 116 changes. The music can be stored in any format. For example, in one embodiment of the present invention, music is stored in music store database in a digital format, such as MP3.

The result of the query is that the music identified in the subscriber's request is transferred to music store computer 114 from music store database 115. An advantage of the present invention is that the entire song is transferred, not just the portion of the song from the time the subscriber selects it. This is advantageous because the subscriber does not need to select the song at its very beginning in order to store the entire song. Another advantage of the present invention is that the subscriber does not have to know the artist or title of the song in order to store it.

Music store computer 114 then transfers the music to base station 104. Base station 104 then transmits the music to car 102 using any transmission protocol for storage therein. Such transmission protocols are well known to those skilled in the art, and include for example, cellular telephone protocols, Wi-Fi protocols, Wi-Max protocols, satellite protocols or any other transmission protocol that can be used to transmit the music. For example, in one embodiment of the present invention, the music is transferred in a digital format. The music is then stored in a music storage device in car 102.

Figure 2:
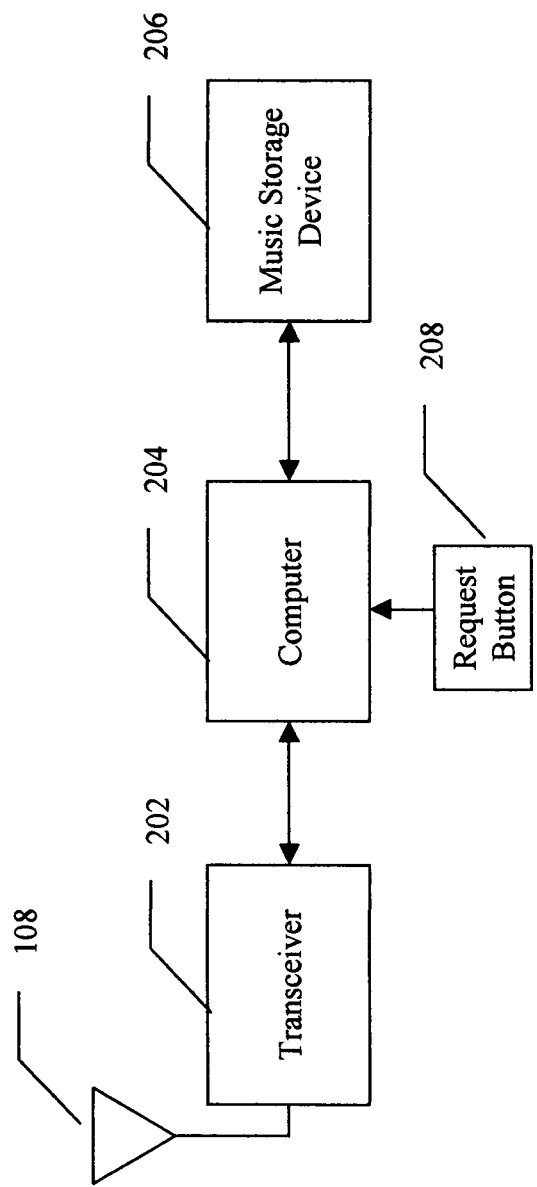
FIG. 2 is a schematic diagram of a system for storing music in a car according to an embodiment of the present invention.

FIG. 2 is a schematic diagram illustrating storage of music in car 102 according to an embodiment of the present invention. For example, the device illustrated in FIG. 2 can be a car stereo or any other device that can receive and store music according to embodiments of the present invention. A transceiver 202 receives the music through an antenna 108. Transceiver 202 contains a receiver portion for receiving music and a transmission portion for transmitting music. Transceiver 202 can be any receiver and transmitter combination, including a separate receiver and transmitter, and does not have to be integrated in a single unit. The received music is amplified, filtered and demodulated as required by a receiver portion of transceiver 202 and transferred to a computer 204. Computer 204 can be any computer configured to receive music from the receiver portion of transceiver 202. Though shown as external in FIG. 2, the receiver portion of transceiver can be internal or external to computer 204. For example, the receiver portion of transceiver 202 can be included in a card inserted into computer 204.

Computer 204 is coupled to a music storage device 206. Music storage device can be any device that can store the music transmitted to it by computer 204, and can be integral with computer 204. For example, music storage device 206 can be a floppy drive, hard drive, CD-ROM, a DVD or a RAM device. Well known techniques for burning CD-ROMs or DVDs can be used where music storage device 206 is a CD-ROM or DVD storage device.

According to one embodiment of the present invention, transceiver 202, computer 204 and music storage device 206 are configured to fit inside of car 102. Transceiver 202 can be any transceiver designed for the purposes of transceiver 202 described above. For example, in one embodiment of the present invention, transceiver 202 is a standard car stereo that can receive, amplify, filter and demodulate signals from base station 104 as well as modulate, amplify, filter and transmit the subscriber's request for storing music. In this embodiment of the present invention, receiver 202 is located in a dashboard of car 102. The computer 204 and music storage device 206 can be located anywhere in car 102. For example, computer 204 and music storage device 206 can be stored in a trunk of car 102.

A storage button 208 that the subscriber presses to request storage of a song can be located in a number of places in car 102. For example, in one embodiment of the present invention, the storage button 208 is located on a control panel (front) of a conventional car stereo. In another embodiment of the present invention, the storage button 208 is located on the steering wheel of car 102. Button 208 can be located in other places as well. For example, the button can be located on a portable device, such as a device that can be kept on a key chain or other portable device. In operation, pressing storage button 208 causes computer 204 to generate the request.

It should be understood that transceiver 202 can be a receiver only. For example, in an embodiment of the present invention, each song is stored in music storage device 206 or alternate temporary storage temporarily from its beginning when it is sent to the device schematically illustrated in FIG. 2. For example, such storage can be in a predetermined area of music storage device 206. If a subscriber desires to store a particular song permanently, the subscriber can provide an indication of that desire. For example, the subscriber can push request button 208 to indicate that he or she desires to store music permanently. Upon making the indication, the desired music is moved from the predetermined temporary storage area to a permanent storage area of music storage device 206.

In embodiments of the present invention where music is stored locally in a temporary storage as it is played (such as in a digital receiver), the request to store the music need not be sent externally to a music provider. Rather, in such cases, the storage location of the beginning of the song currently being played is identified, and the song is subsequently stored to music storage device 206. Further, in a digital receiver, the receiver can be configured to store a portion of each song received or the entire song, to provide the user with an opportunity to press the storage request button 208.

Figure 11:
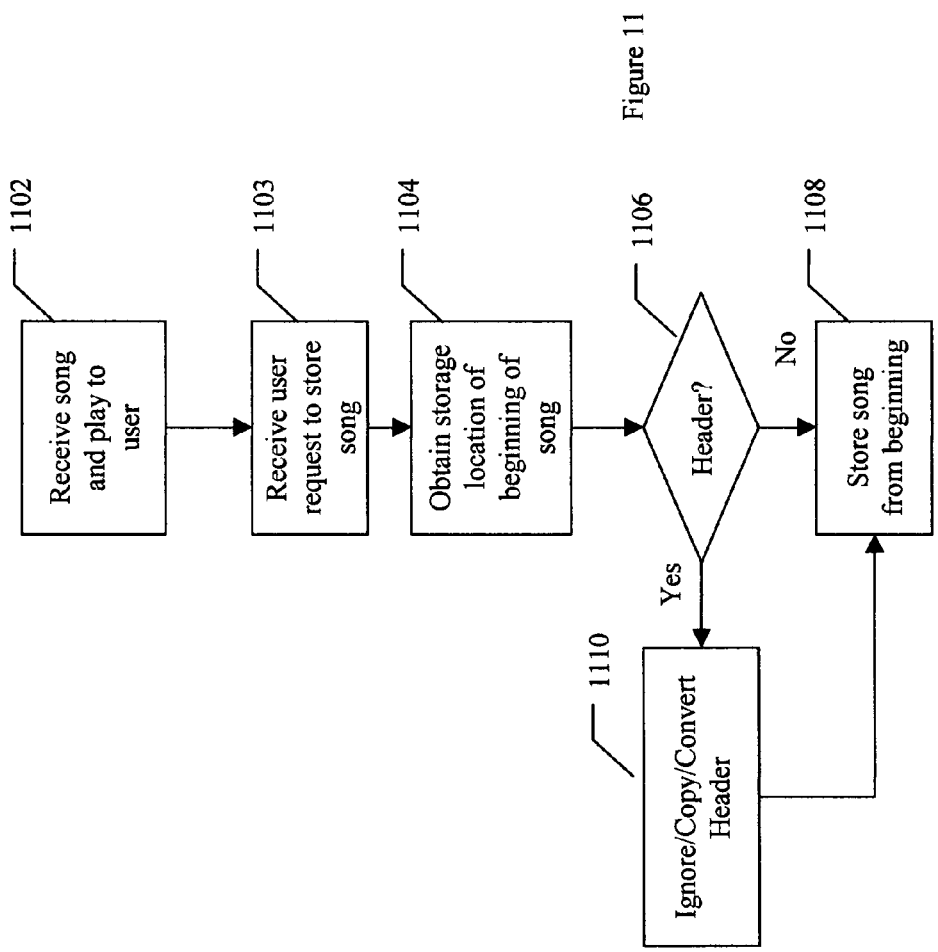
FIG. 11 is a flow chart for a method for identifying the beginning of a song.

FIG. 11 is a flow chart for a method for identifying the beginning of a song stored in a temporary storage as it is played according to an embodiment of the present invention. In step 1102, a song is received for playing to a user. When the song is initially received, the memory location in which the first byte or word or its data is stored in a currently playing song storage location. Later, when a user provides an indication that a currently playing song should be stored from its beginning, in step 1104, the system accesses the currently playing song storage location to determine where the beginning of the song is.

In some systems, the song data includes a header that provides additional information regarding the song. For example, the header may include information such as that title of the song, the artist, the file length and other additional information related to the song. In such a case, all or part of the header can be stored along with the song data. In an alternative embodiment of the present invention, the header can be used to generate another header that is in a format expected by the storage device into which the song is stored. In another embodiment of the present invention, the song is stored without a header. Consequently, in step 1106, the system determines if there is a header. If there is no header, the song is stored from the beginning in step 1108. If there is a header, the header is processed (either ignored, copied or converted) in step 1110, and the song is stored from the beginning in step 1108.

Figure 12:
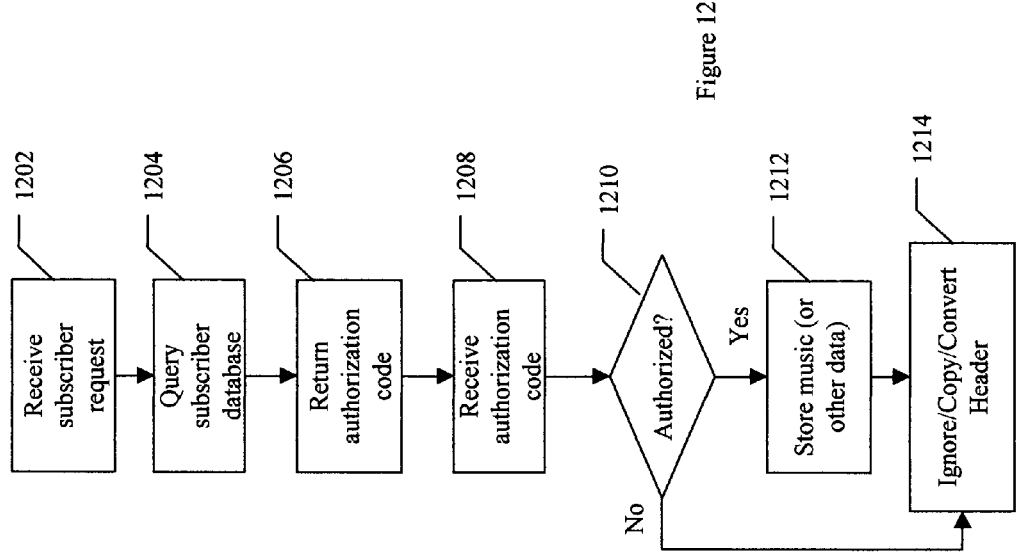
FIG. 12 is a flow chart for a method for providing authorization of storage of music requested by a subscriber according to an embodiment of the present invention.

Embodiments of the present invention can also provide authorization prior to storage of the music. FIG. 12 is a flow chart for a method for providing authorization of storage of music requested by a subscriber according to an embodiment of the present invention. The method illustrated in FIG. 12 is applicable generally to storage requests from and storage of music to a vehicle. That is, the method of FIG. 12 is generally applicable to many embodiments of the present invention.

In step 1202, the subscriber's request to store music (or other data) is received. In step 1204, a subscriber database is queried using information in the received request. The information includes an identification of the subscriber, such as the subscriber's name or the subscriber's account number. The subscriber database contains information for each subscriber of the system. In an embodiment of the present invention in which music storage authorization is operative, the information contained in the database for each subscriber includes whether the subscriber is authorized to store music.

If the subscriber is authorized to store music an authorization code so indicating is returned in a return message in step 1206. The authorization code can be any code that can be used to indicate that the subscriber is authorized to store music (or other data). For example, in one embodiment of the present invention, the authorization code can be a bit that is set in a predetermined word of the return message. If the bit is set, the subscriber is authorized to store music (or other data). If the bit is not set, the subscriber is not authorized to store music (or other data). In another embodiment of the present invention, the authorization code is a predetermined bit pattern that is stored in a predetermined location in the return message. If the predetermined code is detected in the return message, the subscriber is authorized to store the music (or other data). If the predetermined code is not detected in the return message, the subscriber is not authorized to store the music (or other data).

The authorization code is received in a return message in step 1208. In step 1210, the return code is checked. If the return code indicates that the subscriber is authorized to store music (or other data), the music (or other data) is stored in step 1212 and the method ends in step 1214. A message indicating successful storage of the music can be provided to the user. If the subscriber is not authorized to store music in step 1210, the method ends in step 1214. In the case where the subscriber is not authorized to store music, a message so indicating can be provided to the user. Messages indicating status of the storage process can be provided in other embodiments of the present invention as well.

The receiver portion of transceiver 202 can be the same receiver used to receive the music that is played initially, or a separate receiver. Where the receiver is the same receiver, a number of techniques can be used to receive the music data while receiving the music that is being played. In a digital radio for example, the music is received and stored while the song is playing. In that case, in response to the user's request, the beginning of the song being played at the time of the request is identified as described above, and the song is stored.

The authorization code allowing storage of songs can also be stored in the radio at the time of manufacture. In such a case, the subscriber pays a premium to be able to store songs any time.

Some digital radios may not store the song as it is being played. In an embodiment of the present invention employing such a digital radio such a case a request is sent back to the music provider as described above to store the music. The music provider that provides the music to be stored can do so using well-known data multiplexing techniques to multiplex the data corresponding to the music to be stored with the data corresponding to the normal programming. When the multiplexed data is received, a de-multiplexer in the receiver can separate the multiplexed data stream so that the desired song can be stored, while still providing normal programming to the subscriber.

In an analog radio, where the same receiver is used to receive music data and play music, the music data can be sent using well-known bandwidth sharing techniques. For example, in one embodiment of the present invention, the data can be sent on a separate carrier. A second tuner in the receiver that is tuned to the separate carrier having the music data is used to received the music data. The signal received by the second tuner is amplified, filtered and demodulated as required to recover the music data, which is then stored.

Figure 13:
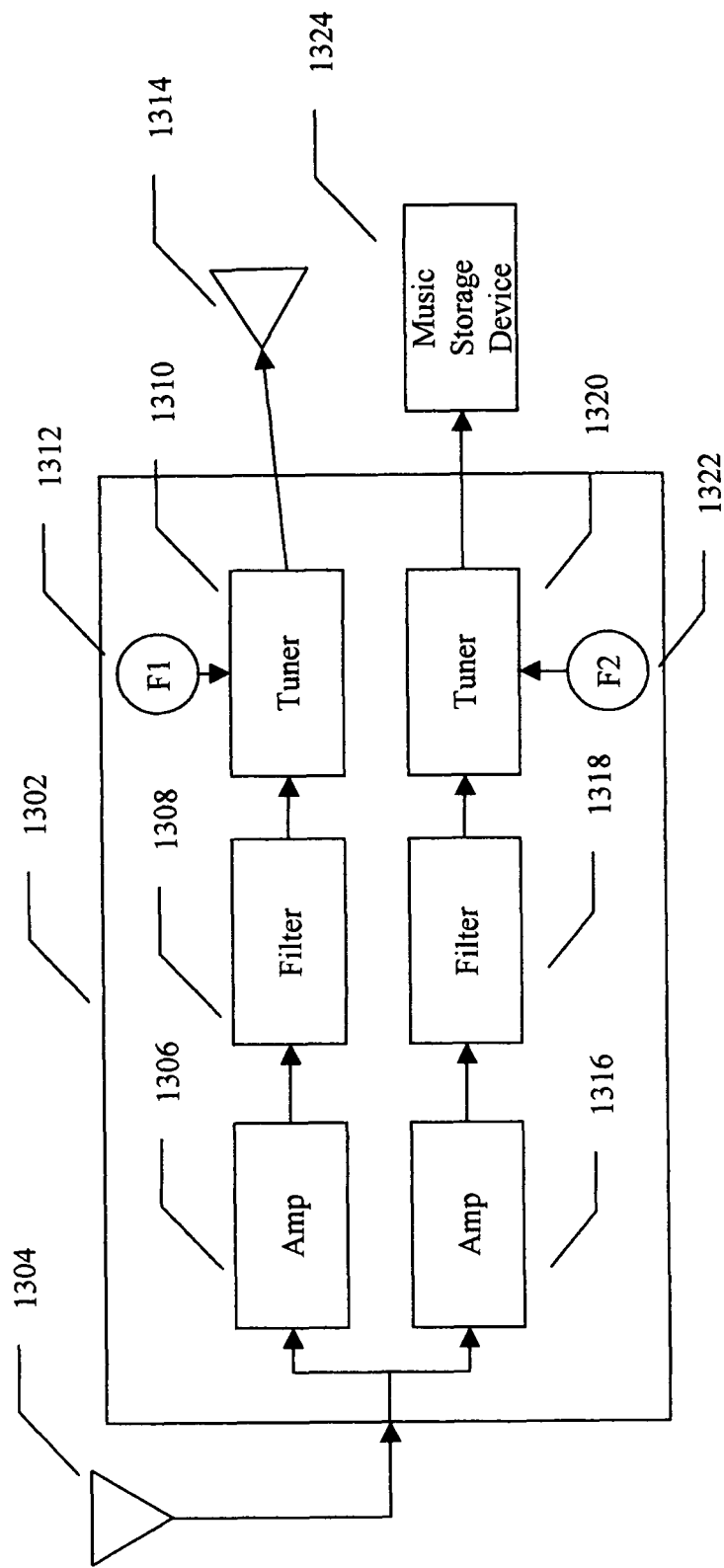
FIG. 13 is a schematic diagram of a receiver having two tuners according to an embodiment of the present invention.

FIG. 13 is a schematic diagram of a receiver 1302 having two tuners, one used in receiving the music for playing and one used in receiving the music data according to an embodiment of the present invention. The music signal having the music data modulated thereon at a separate carrier is received through antenna 1304. The music signal is split and sent to two demodulation paths. A carrier F1 carries the music being listened to and a carrier F2 carries the music data to be stored. In the first path, the music signal is amplified by amplifier 1306, filtered in filter 1308 and demodulated in tuner 1310 using carrier frequency F1, supplied by oscillator 1312. The demodulated music is played through speaker 1312. In the second path, the music signal is amplified by amplifier 1316, filtered in filter 1318 and demodulated in tuner 1320 using carrier frequency F1, supplied by oscillator 1322. The demodulated music is stored in music storage device 1324.

Figure 14:
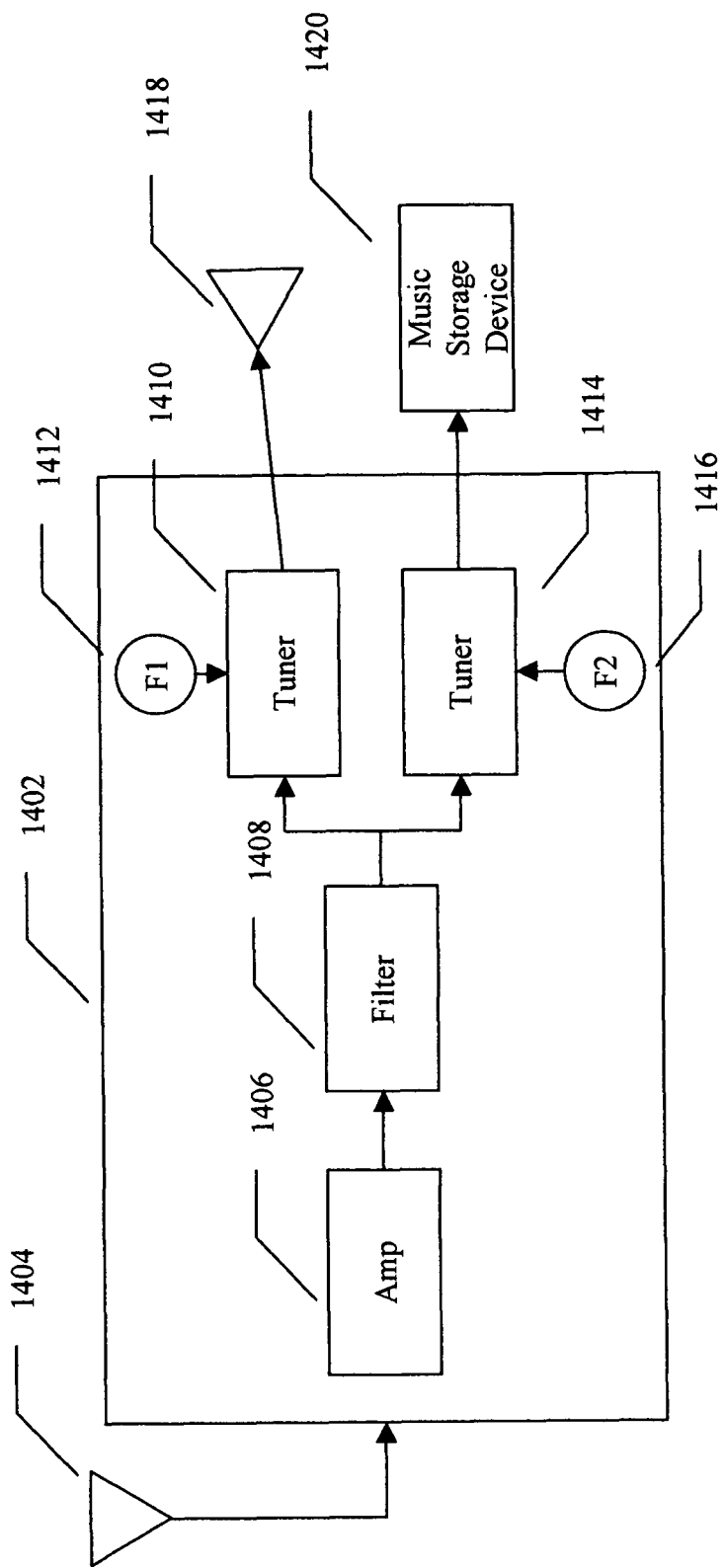
FIG. 14 is a schematic diagram of an alternative embodiment of a receiver having two tuners according to an embodiment of the present invention.

FIG. 14 is a schematic diagram of a receiver 1402 having two tuners, one used in receiving the music for playing and one used in receiving the music data according to another embodiment of the present invention. The music signal having the music data modulated thereon at a separate carrier is received through antenna 1404. A carrier F1 carries the music being listened to and a carrier F2 carries the music data to be stored. The music signal is amplified by amplifier 1406, filtered in filter 1408. The filtered signal is then split to provide a split signal having a first portion and a second portion. The first portion of the split signal is demodulated in tuner 1410 using carrier frequency F1, supplied by oscillator 1412. The demodulated music corresponding to the first portion of the split signal is played through a speaker 1418. The second portion of the split signal is demodulated in tuner 1414 using carrier frequency F1, supplied by oscillator 1416. The demodulated music is stored in music storage device 1420.

In an alternative embodiment of the present invention for music storage using an analog radio, a second receiver is provided. The second receiver is used to receive the music data, which is received and then stored.

Figure 3:
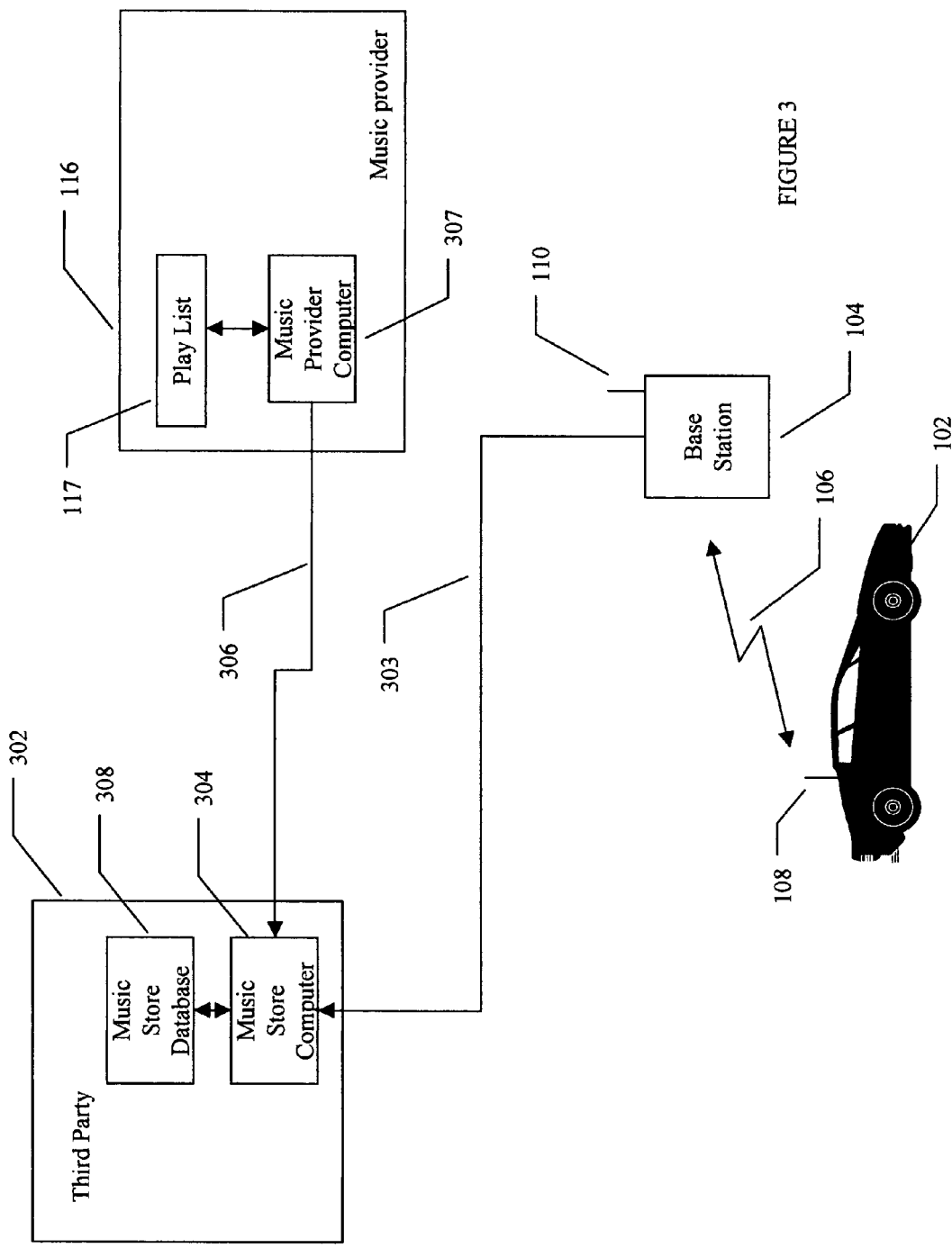
FIG. 3 is a schematic diagram of another embodiment of the present invention in which a third party music service provides music storage and retrieval services rather than the subscriber or the music provider.

FIG. 3 is a schematic diagram of another embodiment of the present invention in which a third party music service 302 provides music storage and retrieval services rather than the music provider. For example, third party music service 302 can be a business set up to retrieve and deliver music according to the present invention.

In the embodiment of the present invention illustrated in FIG. 3, a subscriber indicates a desire, for example, by pushing a button, to store currently playing music in the manner described above with respect to FIG. 1. The subscriber's indication causes a request to be generated. The request can be as described above. In addition, in the embodiment of the present invention illustrated in FIG. 3, the request is configured to include an identification of the music provider, for example, music provider 116. This identification is required because in the embodiment of the present invention illustrated in FIG. 3, a third party music service 302 is designated to respond to the subscriber's request, not music provider 116.

The request (including the identification of the third party music service) is received in the base station and transmitted from base station 104 to third party music service 302 over a transmission interface 303. Transmission interface 303 can be any transmission interface, including air or land, including for example, computer networks, telephone networks, satellite networks, and combinations of such networks, that is capable of transmitting the request from base station 104 to third party music service 302. Such transmission interfaces as well as transmission of the request over such transmission interfaces are well known to those skilled in the art.

A music store computer 304 receives the request. Music store computer 304 can receive the request directly if it is configured to receive transmissions from interface 303 or it can receive the request from other equipment (not shown) that is capable of receiving the request transmitted over transmission interface 303.

When the request is received, music store computer 304 extracts the identification of the music provider that is playing the music that the subscriber wants to store from the request, for example, music provider 116. Music store computer 304 then generates a music identification request that it sends to a music provider computer 307 in music provider 116. Preferably, the music identification request comprises the extracted identification. Music store computer 114 in FIG. 1 can also be configured to perform the functions of receiving and responding to requests from third party music services according to the present invention.

Music provider computer 307 receives the music identification request and determines that it is a request to identify music that is being played at the time of the subscriber's request. In one embodiment of the present invention, music provider computer 307 consults play list 117 to identify the music being played at the time of the subscriber's request to store the music. As described above, for example, the identification can be by title, artist, a music catalog number or any other identification of the music.

Music computer 307 transmits or causes to be transmitted the identification of the music to music store computer 304. Music store computer 304 receives the identification of the music and uses it to query a music store database 308. Music store database 308 receives the query containing the identification of the music, retrieves the music based on the identification and forwards the music to music store computer 304. Music store computer 304 forwards the music to base station 104, which then transmits the music to vehicle 102 for storage therein as described above.

In alternative embodiments of the present invention, music provider 116 receives the request for identification of the music from music store computer 304 and itself responds to the request by transmitting the music to base station 104 or to music store computer 304 for transmission to base station 104 as described above. In this manner, music service 302 does not have to keep its own independent copy of music store database 308.

In another embodiment of the present invention, music store computer 304 receives the identification of the music being played from music provider 116 and sends it to another party (not shown) that has a music store database with instruction that the other party satisfy the subscriber's request by sending the music corresponding to the identification through base station 104 to car 102 for storage.

If third party music service provider 302 determines that it does not have the requested music stored in music store database 306, it can send a message so indicating to be displayed to the subscriber in car 102. For example, such message can be displayed on the radio display of car radio in car 102.

Figure 4:
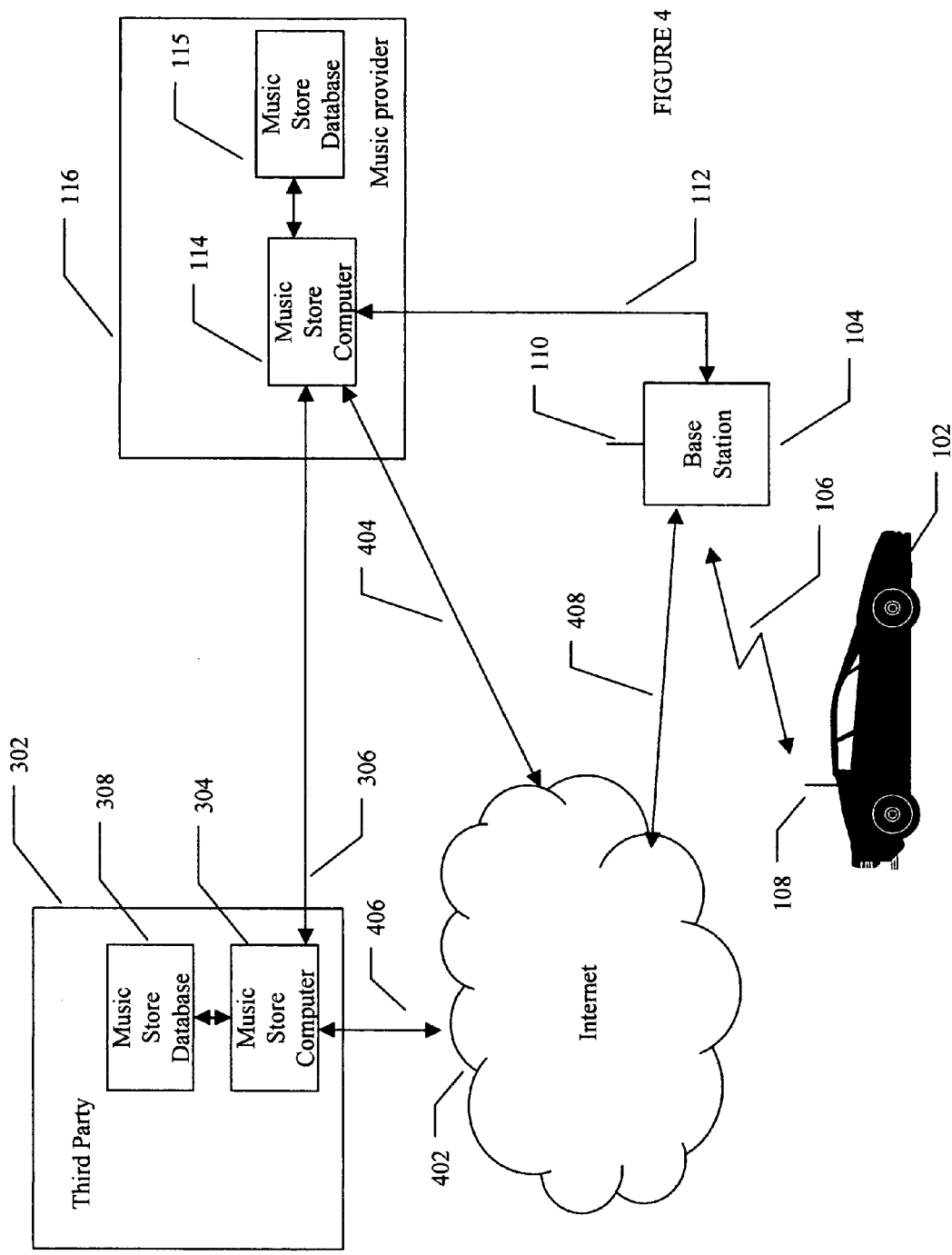
FIG. 4 is a schematic diagram of a system for storing music according to another embodiment of the present invention.

FIG. 4 is a schematic diagram of a system for storing music according to another embodiment of the present invention. The embodiment illustrated in FIG. 4 uses many of the concepts described above for communicating a subscriber request to store music to a party that satisfies that request.

FIG. 4 illustrates communication of the subscriber's request using the Internet 402. It would be appreciated by those skilled in the art that any computer network can be used, provided it has the appropriate devices connected thereto for carrying out the present invention. As shown in FIG. 4, music provider 116, third party music provider 302 and base station 104 are coupled to the Internet 402 through links 404, 406 and 408 respectively. These Internet connections are established in manners that are well known to those skilled in the art.

In operation, for example, a subscriber desires to store music that he or she hears while traveling in car 102. In an embodiment of the present invention, the subscriber indicates this desire by pressing a button. Pressing the button, causes a request to be generated as described above. The request is sent to base station 104. Base station 104 can forward the request to a number of places. In one embodiment of the present invention, for example, base station 104 determines where to send the request based on an address included in the request. For example, the address can be the network address of the computer that the request is to be sent to. When using the Internet, the request also includes appropriate addressing for forwarding the request to the appropriate music provider to handle the request. This can be for example, a computer network address of a music store computer 114 or music store computer 104.

Base station 104 determines the address of a computer associated with the music provider that will handle the request, and forwards the request to the music provider indicated by the address included in the request. The address can be predetermined and stored in base station 110 or can be provided in the request sent to base station 104. In the latter instance, the request is stored in the computer making the request, for example computer 204. The music provider associated with the address receives the request, and identifies the music desired by the subscriber as described above. The music is retrieved and sent back through Internet 402 to base station 104. Base station 104 transmits the music to car 102 where it is stored as described above. Base station 104 can also send the music to any other music storage device having an Internet address. For example, as described above, the music can be stored in a music storage device in the user's home.

Alternatively, the music responsive to the request can be sent to another computer. In such an embodiment, the request includes an network address of the recipient computer. Using such an embodiment of the present invention, a subscriber can give gifts. For example, the subscriber can provide the address of a gift recipient's computer as the recipient computer's network address. By providing the gift recipient's computer address, the music is stored to the gift recipient's computer. Further, according to embodiments of the present invention, the gift recipient's computer can also be a car stereo having music storage capabilities as for example described above with respect to FIG. 2.

Music providers are able to bill for their services. Such billing can be on a per use basis or a periodic basis and can be prepaid or postpaid. A per-use subscriber is billed for each use of the system, for example, for each music storage request. A periodic subscriber is billed for using music storage services according to the present invention for a period of time, for example, one month. During that period of time, the subscriber can make as many requests for storage of music as desired. Other billing paradigms can also be used.

Billing requires that subscribers be uniquely identifiable. This subscriber identification can be implemented any way to uniquely identify the subscriber. A common such way is to assign an account having an account number to the subscriber. The account can be created during a registration process. The account number can be assigned to the subscriber through the registration process.

Information about the subscriber can also be obtained during this registration process. The information can be stored in a configuration file or other account file of the subscriber. For example, the subscriber's name, address, age, income, ethnicity, sex and any other information can be obtained. This information can be used to create reports concerning which types of subscribers use the service, when they use it and what music they prefer. Such reports can be sold to interested parties. Information required for billing, such as credit card account information, electronic contracts, billing information and any other required billing information can be obtained from the subscriber during registration. Any such information obtained is stored, for example, in an account corresponding to the subscriber.

The account number can be stored in computer 204. When the subscriber's request is transmitted to the music provider, the account number can be transmitted as well. The music provider receives the account number and uses it to access an account associated with the subscriber. One purpose for accessing the account is to obtain billing information so that the subscriber can be appropriately billed for using the service.

Another reason for accessing the account is to store information about the request for generating reports as described above. The information can include any information. For example, the information can include the title of the music, the artist of the music, the time the request was made and any other desired information.

In operation according to one embodiment of the present invention, an identification of the subscriber, for example a subscriber account number, is included in the request transmitted to base station 104. When the music provider receives the request, it extracts the subscriber identification and uses it to access the subscriber's account. This account can be, for example, the subscriber's account created during registration. If the subscriber is a per-use subscriber, the music provider accesses the account and bills the subscriber appropriately. For example, in a per-use billing embodiment of the present invention, the billing may be a one up number stored in the subscriber's account indicating the number of times the service was used. This number is then consulted at the end of a billing period, for example, a month, and the subscriber is billed in accordance with this one up number. After billing, the one up number is reset.

If the subscriber is a periodic subscriber, the music provider accesses the account to verify that the subscriber is a registered subscriber. If the subscriber is a registered subscriber, the subscriber's request is satisfied. If the subscriber is not a registered subscriber, the subscriber's request is denied.

Subscribers can also prepay to use a system according to the present invention. Such prepayment can be on a per-use or periodic basis. In a prepay system, the subscriber pays in advance of using the service. The subscriber's account is increased by the amount paid. In a prepaid per-use system, each time the subscriber uses the service, the account is reduced by an appropriate amount (the per-use cost to the subscriber to use the service). In a prepaid periodic system, at the beginning of the period, or any other desired time, the subscriber's account is deducted by an amount corresponding to the fee for periodic use of the music storage service.

It should be understood that music providers can use any combination of billing. For example, music providers can offer per-use billing to some subscribers, periodic billing to some subscribers and prepaid billing to some subscribers.

A problem that might be encountered when storage of the music is to a mobile platform such as car 102 is that of interrupted service during downloading of music from the music provider responding to the subscriber's request. For example, if vehicle 102 moves out of a coverage area of base station 104 during downloading of music, it is likely that an incomplete file will be downloaded. Communication using satellite can solve this problem as the satellite footprint or coverage area can be quite large, and generally large enough to cover the area in which the mobile platform is likely to move. In an embodiment of the present invention, a satellite communication link is used to download the music to the mobile platform for storage.

Another technique for solving the problem is to use the cellular telephone network. Cellular telephone service has reduced this problem somewhat through its handoff technology. Thus, if vehicle 103 is communicating with a base station that is a cellular telephone base station, it can use cellular handoff technology to possibly continue the download process.

However, downloading can be interrupted even using handoff technology. To overcome this problem in one embodiment of the present invention, a download success flag is used. The download success flag default is TRUE, indicating that a download was successful. If however, a download is unsuccessful, the download success flag is set to FALSE. In one embodiment of the present invention, the download success flag is stored in computer 204. Computer 204 monitors the success flag. If computer 204 determines that the success flag is FALSE, it takes action as described below. After the corrective action is taken, the download success flag is reset to TRUE.

When computer 204 determines that the success flag is set to FALSE, computer 204 causes the subscriber request to be retransmitted when communication is established with a base station that can respond to the request. For example, car 102 may come within the coverage area of another base station that can respond to requests to store music according to the present invention. The retransmitted request can contain the same information as in the originally transmitted request. In addition, the retransmitted request can contain any other information to identify the request as a retransmitted request.

In an embodiment of the present invention, the retransmitted request causes music to be downloaded to vehicle 102 from the beginning of the music file. Storage of the music takes place as described above. In this embodiment, preferably, the file that may have been started previously is deleted or written over.

In another embodiment of the present invention, a progress marker is used to indicate how much of the music has been successfully downloaded. For example, if 50 percent of music file was successfully downloaded, the progress marker would so indicate. For example, the progress marked can be in terms of amount of data sent in bytes, percentage of file successfully transmitted or any other progress indication that provides the amount of the file successfully sent.

Using a progress marker precludes the need to restart downloading of the music from the beginning of the music file. Rather, the progress marker can be sent in a retransmit request. In this case, the music file from which the music is obtained is opened, and downloading begins from the point indicated by the progress marker. For example, if the progress marker indicates that 50 percent of the file had been successfully transmitted, downloading begins with the data after that 50 percent. If the progress marker is in terms of absolute number of bytes sent, downloading begins with the next byte in the file as indicated by the value of the progress marker.

In one embodiment of the present invention using a progress marker, the originally downloaded portion of the file is opened, and the new data is appended to this file. Use of the progress marker makes the downloading process more efficient in the event of interrupted downloading because downloading does not have to begin from the beginning of the music file. Rather only the portion not yet downloaded need be obtained. The progress marker can be updated if there is another interruption of music, and the process of re-downloading the music file is repeated using the updated value of the progress marker.

In another embodiment of the present invention, base station 104 is a cellular telephone base station. This embodiment of the present invention provides another means for requesting the music storage service of the present invention. In this embodiment of the present invention, the subscriber makes the request for storing music using a cellular telephone. For example, such a request can be made by dialing a special music request number on the cellular telephone. By dialing the music request number, the subscriber is connected to a music provider, be it the provider that actually plays the music or a third party music provider.

Upon receiving the telephone call, the music provider attempts to determine the music that is requested. Where the music provider is the provider of the actual music that the listener hears, this can simply be a query of a play list to determine the music that is being played at the time of the telephone call.

Where the music provider is a third party music storage provider, several techniques can be used for determining the identity of the music provider. For example, the music provider can prompt the subscriber to enter the call letters of a radio station that the subscriber is listening to. Alternatively, the subscriber can input the call letters of the radio station using the corresponding keys on the dial pad of the cellular telephone. Another technique that can be employed is to have the subscriber speak the call letters of the radio station into the phone. The music provider can use well-known voice recognition techniques to decode the spoken call letters to determine the identity of the music provider.

In another embodiment of the present invention, the subscriber enters or is prompted to enter one or more digits that correspond to the radio station that the subscriber is listening to. The digits can be compared to a list that has music provider identities and corresponding one or more digits that can be entered by the subscriber. Such a list for example, can be a table stored in a memory of third party music computer 304. This table can be generated from information provided by the subscriber when the subscriber registers for the music storage service offered by a third party music storage provider. Alternatively, the table is pre-configured. In one embodiment of the present invention this table is modifiable by the subscriber, for example, by accessing a website of the third party provider that makes such modification possible.

In another embodiment of the present invention, the cellular telephone used to communication with base station 104 and the car radio are configured so as to allow communication with one another. Such communication can be provided using well known Bluetooth technology for example. In this manner, the cellular telephone can obtain the identity of the music provider from the car radio.

In another embodiment of the present invention, the cellular telephone is configured with a communication protocol such as Bluetooth for allowing it to communicate with other devices such as music sources in a mall or record store. When a subscriber hears music he or she desires to store, the subscriber can dial a number for storing the music as described above. The cellular telephone determines the music being played by the music source by communication with the music source using the communication protocol. The music can then be downloaded for storage to a storage device, such as the cellular telephone or other storage device as described above.

In an alternative embodiment of the present invention, the subscriber does not have to dial a telephone number. Rather, the subscriber can simply press a button or choose a music storage menu option on the cellular telephone to indicate his or her desire to store the music. Upon detecting the indication, the cellular telephone communicates with the music source to obtain the identification of the music the subscriber desires to store. For example, the cellular telephone can send a request to the music source indicating the subscriber's request to store music. The request can including information related to the subscriber such as name, address, email address, credit card information, telephone number and other information so the subscriber can be appropriately billed.

Another reason for providing this information is to obtain customer information that can be used for promotional and other business-related purposes, including determining customer-buying trends. In addition, the information provided in the request can include a music storage account number associated with the subscriber. The account information can be used for alternate billing, such as through a third party subscription service offering music storage services and to obtain a configuration file corresponding to the user. The configuration file can include alternate storage location where the user desires the music to be stored.

Upon receiving the identification of the music provider that is providing the music that the subscriber desires to store, the third party music provider contacts the music provider, for example the music provider that is associated with the entered call letters, and responds to the request as described above. For example, in one embodiment of the present invention, the third party music storage provider contacts the identified music provider to obtain an identification of the music being played. This contact preferably includes a request for the music desired by the subscriber to be identified. The request can include any information that the music provider requires for identifying the desired music, for example, the time the subscriber indicated a desire to store the music. Using the information, the music provider consults a play list to identify the desired music, for example, the music scheduled to be played (or actually played) at the time included in the request. The music provider forward the identification to the third party music storage provider. Using the identification provided by the music provider, the third party music storage provider obtains the music and forwards for storage to satisfy the subscriber's request.

Music can be downloaded to other devices besides a storage device in a vehicle according to other embodiments of the present invention. For example, the subscriber can have music downloaded to a cellular telephone, a landline telephone, a portable telephone, a pager, a personal digital assistant (PDA), a personal computer, an iPOD, or any other device the subscriber desires to download the music to.

Regardless of the device, the download can be of the entire music file or of a portion of the music file. Preferably, the music is downloaded in a format that the device can use without requiring further formatting. In an alternative embodiment of the present invention, the music is downloaded in its native format and converted to a format that the device can use. For example, in one embodiment of the present invention in which music is downloaded to a telephone, the music is downloaded in a well-known ring tone or other format. Such formats include polyphonic ring tones and MP3.

In one embodiment of the present invention, the subscriber can choose to download the music to a cellular telephone. In this embodiment of the present invention, the download can be for a variety of purposes, including for example, for use as a ring tone or for use to play through the cellular telephone speaker.

Figure 5:
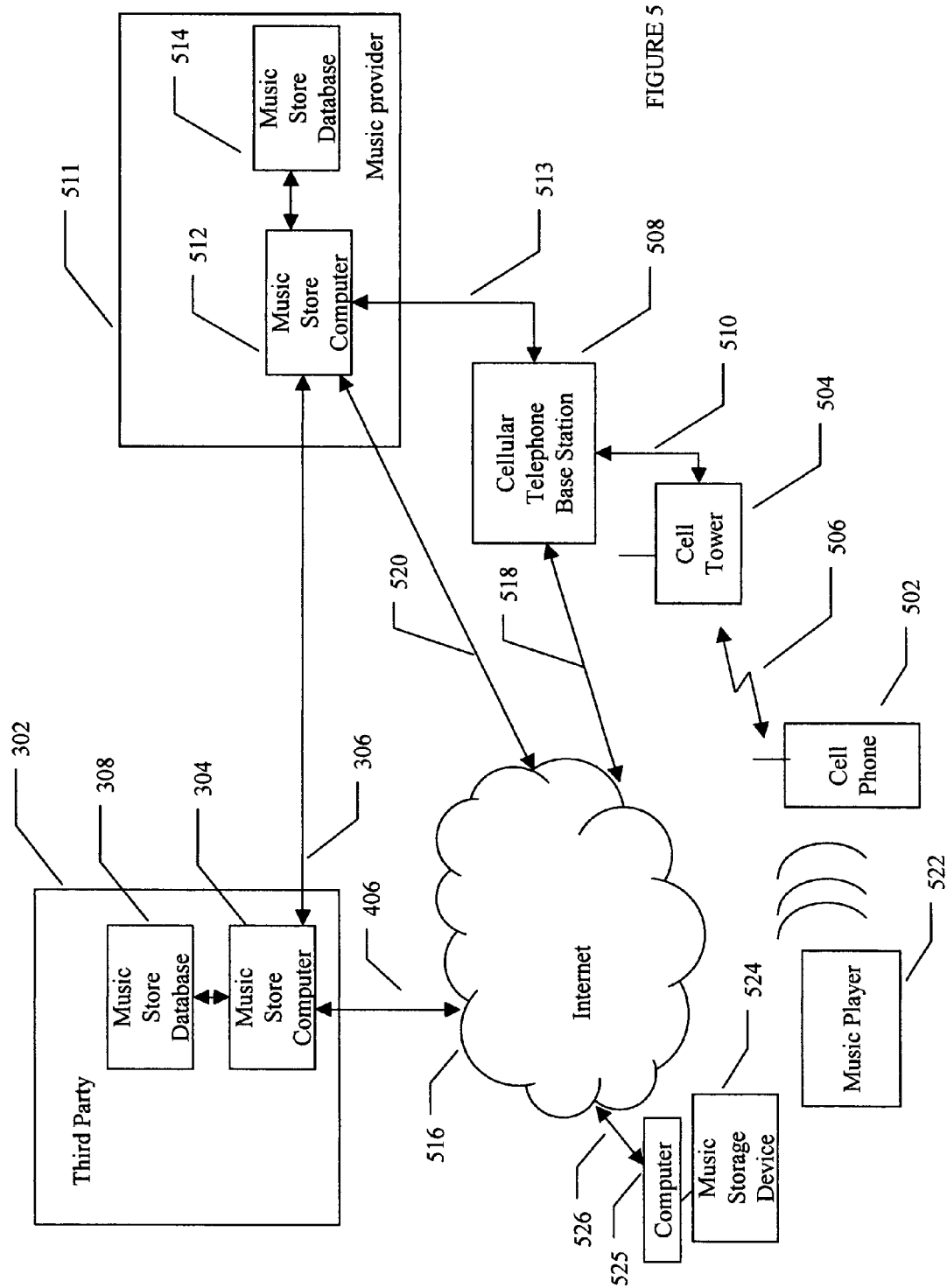
FIG. 5 is a schematic diagram of an embodiment of the present invention in which the receiving device is a cellular telephone.

FIG. 5 is a schematic diagram of an embodiment of the present invention in for storing music heard while a subscriber is listening to it using a cellular telephone. A cellular telephone 502 communicates with a cell tower 504 over an air interface 506. Cell tower 504 in turn is in communication with a cellular telephone base station 508, for example a mobile telephone switching office (MTSO), over link 510.

Cellular telephone base station 508 is in communication with a music store computer 512 in a music provider 511 over a link 513. Music store computer 512 is coupled to a music store database 514. Cellular telephone base station 508 is also in communication with the Internet 516 over a link 518. Music store computer 512 is in communication with the Internet 516 over a link 520. Links 510, 513, 518 and 520 can be any communication links for carrying data transmissions. Such links include air interfaces, land lines, and satellite links and are well known to those skilled in the art.

In operation, a subscriber listening to a music player 522 hears music that he or she desires to store. Music player 522 can be any device for playing music provided by a music provider. For example, music player 522 can be a home stereo, a car stereo, a walkman, a portable radio, a personal computer, a cellular telephone, a pager, an iPOD or any other device capable of playing music.

When the subscriber hears music he or she desires to store, the subscriber provides an indication of such desire. That indication can take many forms as described above, including for example, voice activation or manual activation such as by pushing a button. In one embodiment of the present invention, the indication is received by music player 522, which causes a request for music storage to be made much in the same way as described above. As described above, the music request is satisfied and the music is stored. Storage can be either to cellular telephone 502 itself or to a separate music store 524. Where the music is to be stored can be sent as information in the request or provided in the user's configuration file.

In another embodiment of the present invention, the subscriber provides the indication or request to store the music to cellular telephone 502. Cellular telephone 502 is configured to accept the indication. This can be by configuring the cellular telephone 502 with voice recognition hardware and/or software to recognize the indication or by configuring cellular telephone 502 to recognize a special code entry. The code entry can be any code entry such as any alphanumerical sequence, for example, a numerical code or a star code. Those skilled in the art would recognize other techniques for configuring cellular telephone 502 to recognize the indication by the subscriber.

When cellular telephone 502 receives the indication from the subscriber to store the music it transmits a message to base station 508 through cell tower 504. The message is a request to retrieve and store the music. The music can be stored as desired by the subscriber. For example, the music can be stored as a ring tone to the cellular telephone 502 as described above or to any other location, such as described above. Several techniques for identifying the storage location can be used. For example, the storage location can be sent in the message to base station 508.

The music is obtained either from music store database 308 or 514. If the music is to be stored on a music storage device 524, the address of music storage device is provided in the request. When the music is obtained, it is sent over Internet 516 to be stored on music storage device 524. Music storage device 524 can be any music storage device, including for example, CD-ROM, DVD, RAM, hard disk, floppy disk, removable disk storage device or any other device on which music data can be stored.

If the music is to be stored on cellular telephone 502, it is sent to base station 508. The music can be sent to base station 508 over Internet 516 or directly, if provided by music provider 511. Regardless of how it is sent, it can be sent either as a music file compatible with cellular telephone 502 or as a music file that requires conversion to a music file compatible with cellular telephone 502. For example, some cellular telephones allow playing of MP3 files. In such cases, base station 508 can download all or a portion of the music file directly to cellular telephone 502. In one embodiment of the present invention, the download using the cellular telephone's digital control channel.

If cellular telephone 502 does not accept data in the format of the file, the file must first be converted to a format compatible with cellular telephone 502. For example, if the music is obtained in an MP3 format, but the cellular telephone only accepts ring tones, the music must first be converted from the MP3 format to a ring tone format. This conversion can be performed by base station 508. After conversion of the file to a file compatible with cellular telephone 502, base station 508 downloads the converted file to cellular telephone 502.

There are numerous ways for base station 508 to determine whether cellular telephone 502 is compatible with the obtained music file. According to one embodiment of the present invention for example, when a cellular telephone is powered on in the range of base station 508 or is handed off to base station 508, it registers with base station 508. During the registration process, cellular telephone 502 can send information to base station 508. This information can include an identification of one or more music formats that are compatible with cellular telephone 502. This information is stored in base station 508. Then, when a request to store music to a cellular telephone is processed by base station 508, base station 508 accesses the stored information to determine what music format or formats are compatible with cellular telephone 502.

In an embodiment of the present invention, music storage device 524 is coupled to a computer 525 (and can be integral with computer 525), which is coupled to Internet 516 over a link 526. Link 526 can be any link coupling music storage device 524 to Internet 516, including land line, air interface, cellular link, satellite link or any other link. Music storage device 524 does not have to be coupled to Internet 516 directly. That is, music storage device 524 may be coupled to Internet 516 through a modem in a personal computer. Such couplings of music storage device 524 to Internet 516 would be well known to those having skill in the art.

Alternatively, the subscriber can store the storage location in the configuration file described above. In such a case, based station 508 is configured to retrieve the configuration file to determine the storage location. Depending on the provider of the service, the configuration file can be located within base station 508 or in some other location. If the configuration file is stored in base station 508, base station 508 simply accesses the configuration file.

If the configuration file is located in another location, base station 508 retrieves the file. To retrieve the proper configuration file, base station 508 must determine that location. In one embodiment of the present invention, base station 508 accesses a record associated with the mobile identification number (MIN) of cellular telephone 502. For example, base station 508 can access the subscriber's cellular telephone account. This can be accomplished by accessing the home location register or visitor location records associated with the MIN. Such records would need to be configured to store the location of the music storage preference of the subscriber.

Base station 508 retrieves the configuration file and determines from the information contained therein the location where the subscriber desires the music to be stored. Base station 508 packages this information in another message that it forwards to the music provider that provides the music the subscriber desires to store. The music provider's identity is provided in the request message sent to base station 508. The request sent to base station 508 is similar to requests described above.

For example, in an embodiment of the present invention, cellular telephone 502 is in communication with music player 522. Such communication can be provided using any means for communicating such information between music player 502 and cellular telephone 502. For example, communication between music player 522 and cellular telephone 502 can operate according to the Bluetooth standard. When the subscriber indicates that he or she desires to store music using cellular telephone 502, cellular telephone 502 queries music player 522 for the identity of the music provider providing the music at the time of the subscriber's request. Alternatively, music player 522 detects the subscriber's indication and sends the identity of the music provider to cellular telephone 502. Cellular telephone 522 then places the identity of the music provider in the request that it sends to base station 508.

In another embodiment of the present invention, music player 522 detects the subscriber's indication and itself generates a request through a base station 508 to obtain and store the music in accordance with the subscriber's request as described above.

Using the identity of the music provider found in the request, base station 508 contacts the music provider to obtain the music. This can be done as described above. As described above, the music can be downloaded to base station 508 for forwarding to the location for storing the music specified by the subscriber. Alternatively, base station 508 can transmit the identity of the storage location to the music provider. The music provider then causes the music to be stored in the location specified by the request. Satisfaction of the music storage request proceeds as described above.

In addition, in the embodiment described in FIG. 5, a third party music provider 302 can offer music provider services as described above. I such a case, the identity of third party music provider 302 is provided in the user's request or stored in the user's configuration file. The identify is preferably in the form of a network address. Alternatively the identity is in the form of a name or other identification of the third party music provider 302. This identity is converted to a network address, for example, by a table lookup. Using the network address, the music is obtained from third party provider 302 as described above.

In alternate embodiments of the present invention, the subscriber does not have to be using the cellular telephone at the time the subscriber hears the music in order to download ring tones, MP3 or other music formats. For example, the user can indicate in his account that music is to be downloaded to the user's cellular telephone in the form of a ring tone. When the subscriber requests storage of music, the music is stored to the subscriber's cellular telephone. In one embodiment of the present invention, the subscriber provides the MIN of the cellular telephone to which the music is desired to be stored. Using the MIN, the appropriate base station servicing the cellular telephone is contacted to send the music for download to the cellular telephone.

Figure 6:
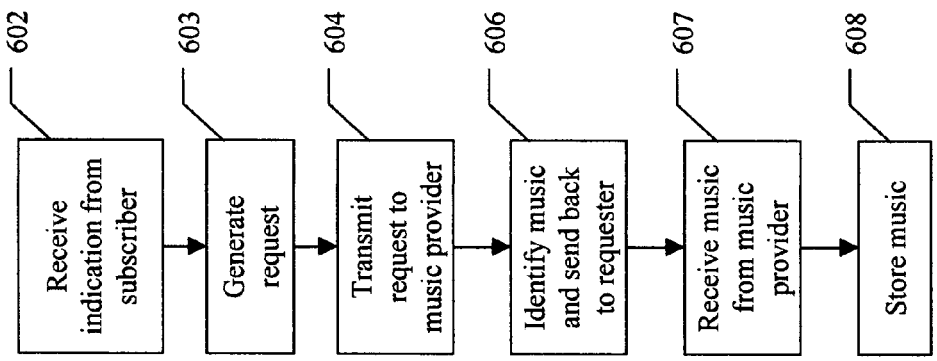
FIG. 6 is a flow chart for a method for storing randomly selected music according to an embodiment of the present invention.

FIG. 6 is a flow chart for a method for storing randomly selected music according to an embodiment of the present invention. A subscriber provides requests (indicates a desire) to store music at the time he or she hears it. As described above, the request can take a number of forms including pushing a button or a voice indication. In step 602, the indication is received. In step 603, a request is generated, for example, by a base station. The request, as described above, includes information required for the subscriber's request to be satisfied. The request is transmitted to a music provider in step 604. In step 606, music corresponding to the request is identified, retrieved and sent back to the requester. The music is received from the music provider in step 607'. The music is stored in step 608.

Figure 7:
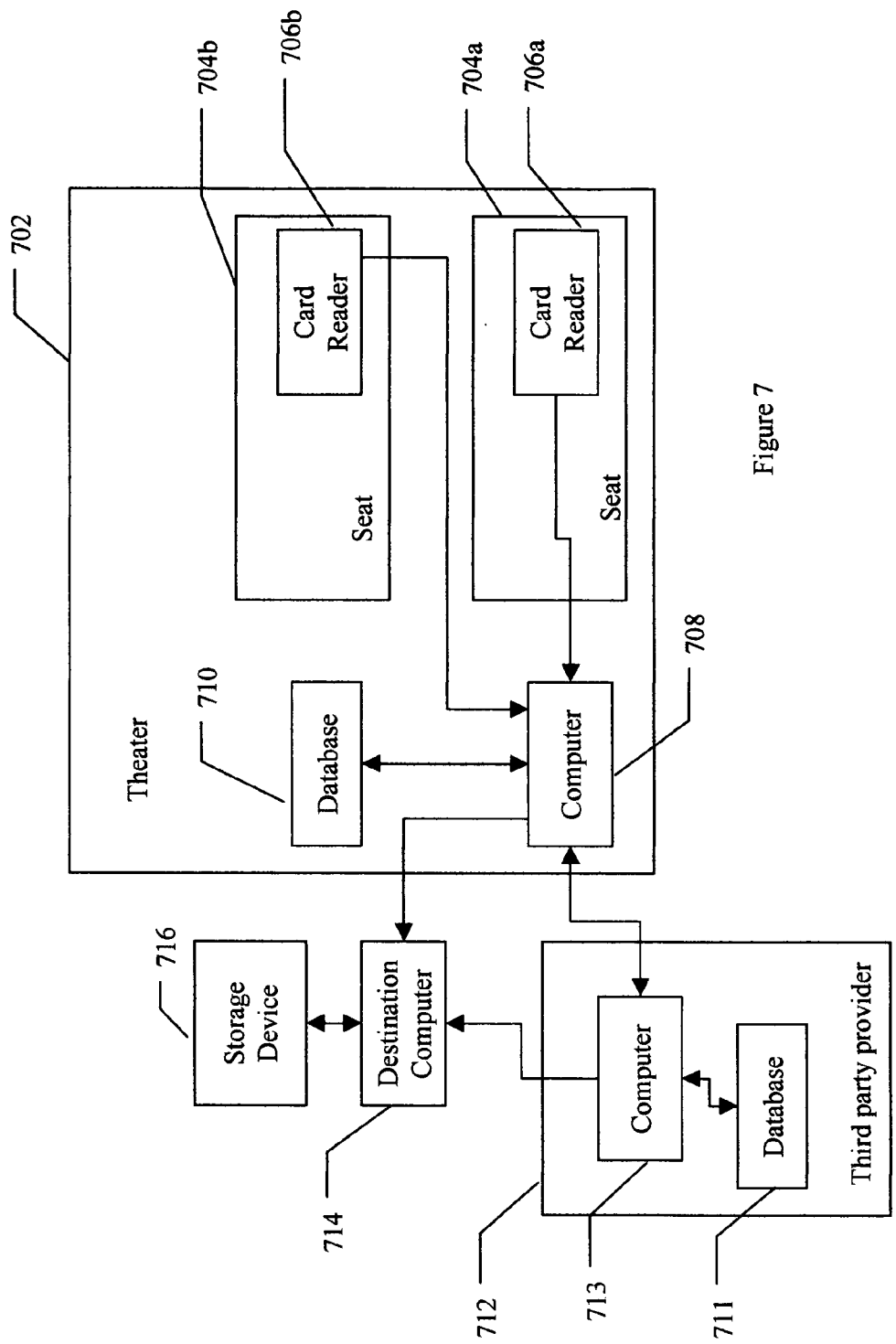
FIG. 7 is a schematic diagram of an embodiment of the present invention for use in storing music or movies that a subscriber hears or views while watching a movie.

FIG. 7 is a schematic diagram of an embodiment of the present invention for use in storing music or movies that a subscriber hears or views in a movie theater. A movie theater 702 contains at least one seat 704a and 704b. For purposes of the present invention, the term seat includes the term chair and the terms are used interchangeably herein. One or more of seats 704a and 704b has a card reader, for example, card readers 706a and 706b. Card readers 706a and 706b are used to read for example a credit card, a debit card, a memory card or any other memory storage card.

In operation, a subscriber desiring to store a song, a movie or soundtrack of a movie to a storage device sits in a seat having a card reader. For example, the subscriber can sit in seat 704a having card reader 706a. The card reader can be located in any convenient portion of the chair. For example, according to one embodiment of the present invention, card reader 706a is located in an arm of seat 704a. When the subscriber desires to store music that he or she hears during a movie, or the entire movie soundtrack or the movie itself, the subscriber provides an indication of his or her desire. According to one embodiment of the present invention, this indication is provided by sliding a card through card reader 706a and pressing a button to indicate the subscriber's desire. For example, according to an embodiment of the present invention, the subscriber slides his or her credit card, debit card or other payment card through card reader 706a. The card can also be slid through the card reader at the time the user sits in the seat. In such a case, the indication can be provided simply by pressing a button. According to an embodiment of the present invention, the card can be a card provided by the movie theater, a record company, a movie studio or other provider. Such a card can be issued in response to a registration process in which the user obtains the card. The cards can be prepaid or pay-for-service via a subscriber account as described above. Alternatively, the card can be the user's credit card, debit card or other card for providing payment.

The music is the song playing in the movie at the time the subscriber indicates his or her desire to store the song. The soundtrack is the movie soundtrack and the movie is the movie itself. Card reader 706a reads the information on the subscriber's card, and generates a request using the information. For example, the request can include the subscriber's name, phone number or other identifying information related to the subscriber and the time of the request.

The request is sent to a computer 708. Computer 708 is any computer, for example a PC or laptop computer that is configured to perform the functions described herein. Such computers that can be configured to perform the functions described herein would be well-known to those having skill in the relevant art.

Computer 708 determines the identity of the movie, song or soundtrack requested by the subscriber. This can be done in a number of ways. For example, in one embodiment of the present invention, several buttons are provided near the card reader that the subscriber can press to indicate his or her desire. For example, in one embodiment of the present invention, three buttons are provided: one labeled "movie", one labeled "song" and the other labeled "soundtrack". The buttons are configured such that when one is pressed, the corresponding identity of the movie, song or sound track is obtained. For example, if a user pressed the "movie" button, the identity of the movie playing in the movie theater is provided to computer 708. This identity can be provided by simply a lookup of a schedule of movies using a time of the request and an identify of a particular theater in which the movie is playing.

In one embodiment of the present invention, the subscriber slides his or her card at any time during the movie and presses one of the buttons to select what he or she desires to purchase. A request is generated when a particular button is pressed. The request includes an indication of the user's selection or movie, song or soundtrack. The request is sent to computer 708. The request can be sent via wireline or using wireless communication, such as Bluetooth, 802.11 or other wireless communication protocols.

Computer 708 then satisfies the subscriber's request by obtaining the requested, movie, song or soundtrack and causing it to be forwarded to a destination computer 714 for storage on a storage device 716. Storage device 716 can be integral with computer 714. Destination computer 714 and storage device 716 are associated with the subscriber. For example, destination computer 714 and storage device 716 can be in the subscriber's car, the subscriber's home or some other destination. In another embodiment of the present invention, the address of destination computer 714 is provided in a configuration file corresponding to the subscriber, or stored on the card itself.

Storage is not limited to a computer. For example, storage can be to a cellular telephone, DVD player or any other storage device for storing the selected movie, song or soundtrack. The destination can be provided on the card or via a configuration file. The configuration file can be created as described above and managed by the movie theater or a third party. Where a third party manages the configuration file, computer 708 is configured to identify and contact the third party. This identification can be provided, for example, by reading the card the subscriber uses to select the movie, song or soundtrack for storage. Moreover, in such an embodiment of the present invention, the address of the computer storing the configuration file can be stored on the card.

As described above, gifts of movies, songs and/or soundtracks can be given by designating the address of a computer associated with the recipient as the destination computer. A user can provide the desired computer address at the time of registration when the user receives the card, or can pre-specify the address in the configuration file.

Where the storage is storage of a movie, the movie can be stored on the storage device but not released or available for viewing by the subscriber until after a pre-determined release date. For example, movie studios that release movies often determine the date when the movie can be released to the public on DVD or other publicly available medium. In such a case, embodiments of the present invention provide for storing users' requests in a pending movie request queue. In one embodiment of the present invention, the request is stored along with the movie release date. In another embodiment of the present invention, the movie identification in the request is used to obtain the release date from a database at the time the pending request is polled.

Periodically, or in some other systematic manner, the movie pending request queue is polled. Any requests for movies where the movie release date has been passed are satisfied. For example, as described above, the movie identified in the request is obtained and sent to the storage location indicated in the request.

In one embodiment of the present invention, a database 710 located at the theater in which the subscriber is viewing the movie stores movies, songs and soundtracks. Computer 708 is configured to query database 710 with the identity of the song, movie or soundtrack requested by the subscriber to obtain the digital file that has a digital representation of the movie, song or soundtrack. The data is obtained and forwarded to destination computer 714 for storage on storage device 716. The data can be forwarded over the Internet or any other method for transmitting the data from computer 708 to destination computer 714.

In one embodiment of the present invention, the address of destination computer 714 is provided in a registration process that the subscriber performs to register with the theater to use the movie, song and/or soundtrack storage service of the present invention.

In another embodiment of the present invention, a third party provider 712 provides the movie and/or music storage service of the present invention. Third party provider 712 can be any third party provider, including for example, a movie studio, record company or other third party provider. In one embodiment of the present invention having a third party provider 712, computer 708 transmits a request to a computer 713 of third party provider 712. The request includes information that is required by third party provider 712. For example, the request can include the identity of the song, movie or soundtrack to be stored and the address of destination computer 714 to which to send the data for storage on storage device 716. In one embodiment of the present invention, the identity of the song, movie, or soundtrack is obtained as described above.

Using the information provided in the request, for example, the identity of the song, movie or soundtrack, computer 713 obtains the data corresponding to the song, movie or soundtrack from a database 711. Database 711 stores digital data corresponding to songs, movies or soundtracks that third party provider 712 can provide.

In an alternative embodiment of the present invention, third party provider 712 sends a version of the movie, song and/or soundtrack to the user other than using a computer network, for example, by mail or other delivery service. For example, in one embodiment of the present invention, the non-electronic version is a DVD, CD-ROM, cassette or other storage medium through the mail or other delivery service. The user can determine the form to respond to the request in a number of ways. For example, additional buttons can be provided to the seat that allow the user to select the form in which to deliver his or her selection. For example, such buttons could be "electronic" to deliver the selection electronically, "mail-DVD" to deliver the selection by mail on a DVD or "Overnight-CD-ROM" to deliver the selection by express delivery service.

Alternatively, the user can select the type of delivery service he or she prefers at the time a configuration file is set up. For example, the configuration file would be set up to indicate the form and preferred delivery service in the configuration file when the user registers for the service. The address of the computer containing the configuration file can be provided by the user during a registration process. This registration process could be performed, for example, when the user obtains the card.

In the case of mail or delivery service where a street address is required, the required address can be determined in a number of ways. For example, the address can be the address associated with the credit card used to purchase the desired movie, song and/or soundtrack. In one embodiment of the present invention, the street address is determined by contacting a credit card or debit card service computer (not shown) associated with the credit card the user slides through the card reader.

Alternatively, a configuration file having the purchaser's street address can be consulted to obtain the required street address information. For example, in one embodiment of the present, invention, where the purchaser registers with the movie theater, the configuration file is stored in database 710. Alternatively, third party providers can provide computer 708 with appropriate configuration file access information. The provided configuration file access information can be stored in database 710.

If the user purchases a card at the movie theater, another mechanism must be used to provide a street address if required. In one embodiment of the present invention, the street address can be encoded onto the card when purchased using information associated with a credit card or debit card used to purchase the card at the movie theater. Thus, at the time of purchase the point of sale device can contact the credit card or debit card provider to obtain the requisite street address information. That street address information can then be encoded on the card purchased at the movie theater to be used to purchase a movie, song or soundtrack as described above. If the user has no credit, debit card or other identification card that has the required street address information, the user can provide the information at the time of sale, and that information can be encoded onto the card when purchased. Other methods for obtaining the required street address information would be known to those skilled in the art.

Computer 713 obtains the appropriate movie, song or soundtrack data from database 711 and forwards it to destination computer 714. The data can be forwarded in a number of manners, including over the Internet or other computer network. The data is then stored on storage device 716.

In another embodiment of the present invention, only the soundtrack or movie or song is available to the subscriber. That is, the theater only provides the subscriber with the ability to store either the movie, soundtrack or song at the time of the subscriber's indication of a desire to store the data. In this case, the data obtained by computer 708 for transmittal to destination computer 714 for storage on storage device 716 is either the movie, soundtrack or song playing at the time of the indication depending upon the particular implementation of the present invention.

Figure 8:
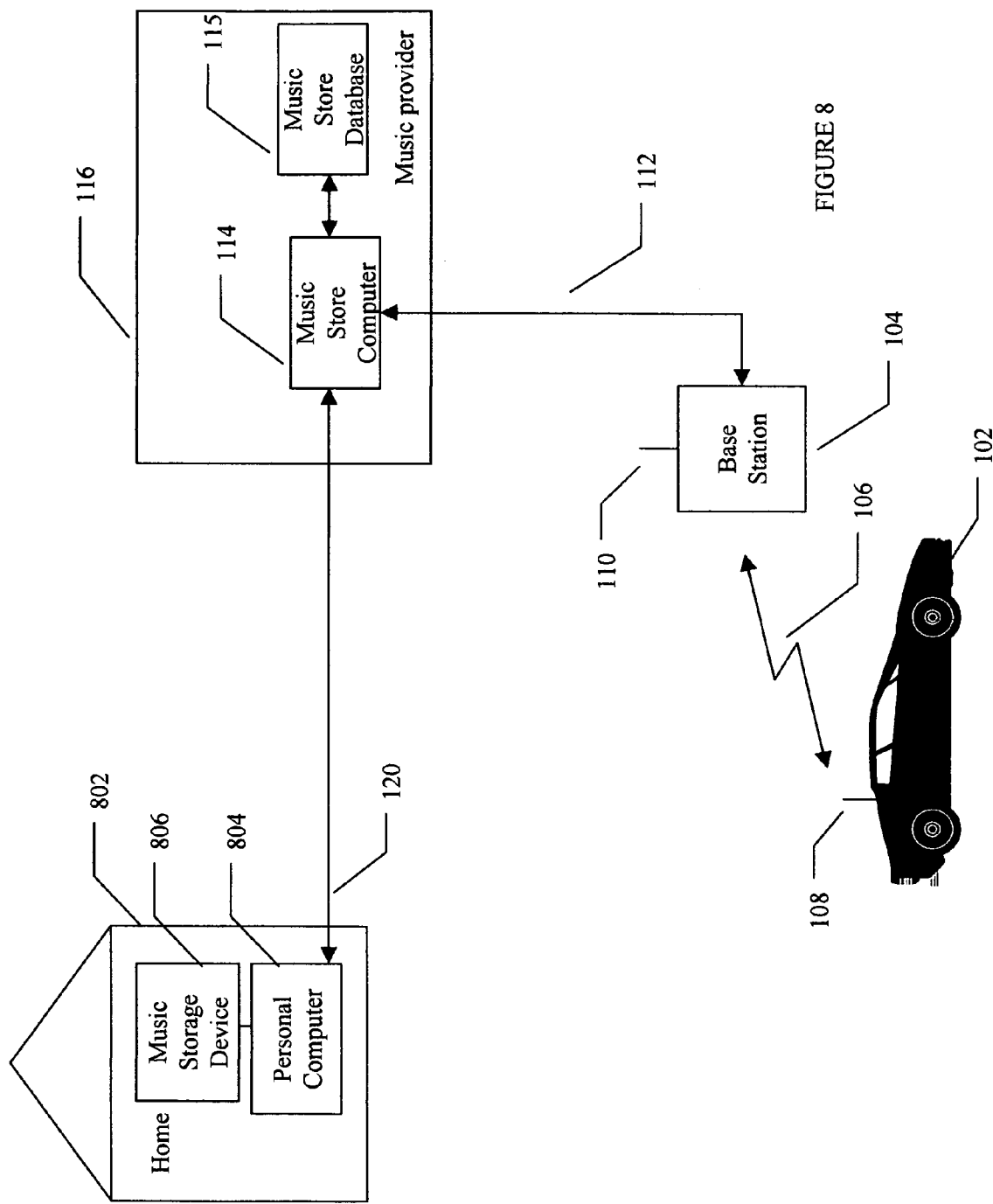
FIG. 8 illustrates an embodiment of the present invention in which the storage apparatus for storing the data requested by the subscriber is located in a home of the subscriber.

The music storage apparatus illustrated in FIG. 2 need not be located in car 102. For example, the music storage apparatus can be located in the subscriber's home. FIG. 8 illustrates an embodiment of the present invention in which the storage apparatus for storing the data requested by the subscriber is located in a home 802 of the subscriber. In the embodiment shown in FIG. 8, the music is transferred to a computer 804 for storage on a music storage device 806. As described above, the music can also be sent over the Internet for storage in the subscriber's home.

Figure 9:
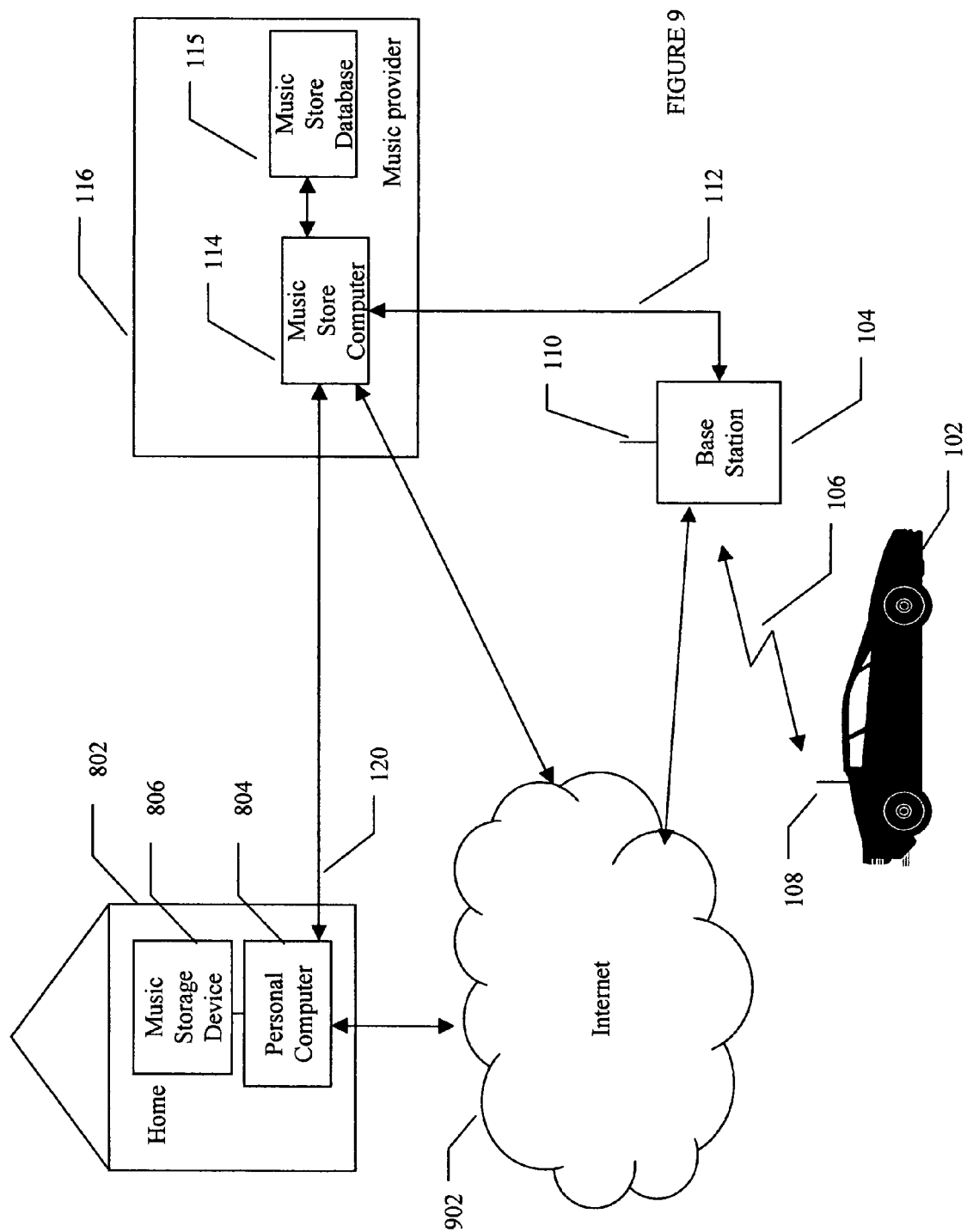
FIG. 9 is a schematic diagram of a system for transmitting the music over the Internet to the subscriber's home according to an embodiment of the present invention.

FIG. 9 is a schematic diagram of a system for transmitting the music over the Internet 902. Transmission over the Internet proceeds as described above. The music storage apparatus can be located anywhere else desired by the subscriber.

Once stored using embodiments of the present invention as illustrated in FIG. 8 or 9, the music can be downloaded to a device in the subscriber's car. Such devices can include any device that can be configured to store the music such as music storage device 206. The downloading can be over any interface, including a computer network, a Bluetooth network or any other network that can be configured for such downloading. Music can also be stored in a subscriber's cellular telephone or other storage device such as an iPod. The cellular telephone or other storage device can then be taken to the car and coupled to the car's stereo. The music stored on the telephone or other storage device can then be played through the car's stereo.

Figure 10:
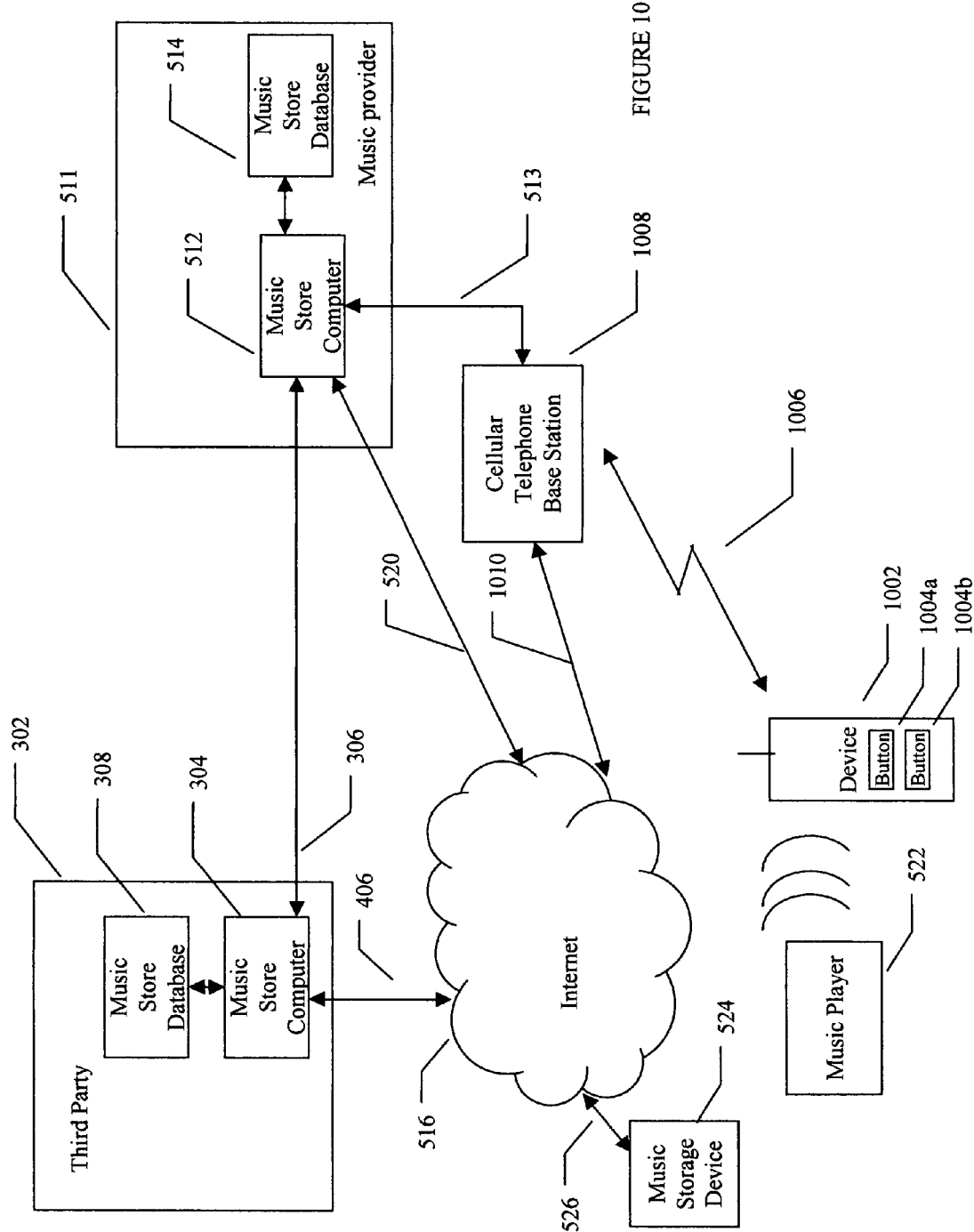
FIG. 10 is a schematic diagram of an embodiment of the present invention using general requesting device.

FIG. 10 is a schematic diagram of an embodiment of the present invention for a general requesting device 1002. Such general requesting device can be any device that can be configured to detect an indication from a user that he or she desires to store data (such as music or movies described above). Exemplary general requesting devices include, without limitation, remote control devices such as television remote controls, device that can be clipped onto clothing, such as might be worn at a gym or when out in general and devices that can be attached to key rings or key chains, including for example, remote car entry devices and key fobs.

General requesting device 1002 can include one or more buttons 1004a, 1004b that a user can press to generate a request to store music that the user is listening to. General requesting device 1002 communicates with a base station 1008 over an interface 1006. Interface 1006 can be any interface using any communication protocol. For example, such interfaces include without limitation, cellular telephone, satellite, computer, and land-line telephone networks, and infrared communication. Base station 1008 is in communication with a music store computer 512 in a music provider 511 over a link 1009. Music store computer 512 is coupled to a music store database 514. Base station 1008 is also in communication with the Internet 516 over a link 1010. Music store computer 512 is in communication with the Internet 516 over a link 520. Links 510, 1009, 1010 and 520 can be any communication links for carrying data transmissions. Such links include air interfaces, landlines, and satellite links and are well known to those skilled in the art.

In operation, a subscriber listening to a music player 522 hears music that he or she desires to download to a destination device. Music player 522 can be any device for playing music provided by a music provider. For example, music player 522 can be a home stereo, a car stereo, a walkman, a portable radio, an iPOD, a personal computer, a cellular telephone, a pager, or any other device capable of playing music.

When the subscriber hears music he or she desires to store, the subscriber provides an indication of such desire. That indication can take many forms as described above, including for example, voice activation or manual activation such as by pushing button 1004a. In one embodiment of the present invention, the indication is received by music player 522, which causes a request for music storage to be made much in the same way as described above. As described above, the music request is satisfied and the music is stored. The music is stored on a music storage device 524. Music storage device 524 can be any music storage device, including for example, CD-ROM, DVD, RAM, hard disk, floppy disk, removable disk storage device or any other device on which music data can be stored.

In an embodiment of the present invention, music storage device 524 is coupled to Internet 516 over a link 526. Link 526 can be any link coupling music storage device 524 to Internet 516, including land line, air interface, cellular link, satellite link or any other link. Music storage device 524 does not have to be coupled to Internet 516 directly. That is, music storage device 524 may be coupled to Internet 516 through a modem in a personal computer or by other coupling mechanism. Such couplings of music storage device 524 to Internet 516 would be well known to those having skill in the art.

Music storage device 524 does not have to be connected to the Internet. For example, music storage device can be coupled to third party 302 or music provider 511 over an air interface. Such air interface can be any air interface, including without limitation, satellite and cellular communication networks.

In operation, the subscriber provides the indication or request to store the music to music storage device 524. The request can be by through any means, including without limitation, voice activation and pressing button 1004. Device 1002 is configured to accept the indication. Those skilled in the art would recognize other techniques for configuring device 1002 to recognize the indication by the subscriber.

When the user makes a request to store music using general requesting device 1002, general requesting device 1002 transmits a message to base station 1008. The message is a request to retrieve and store the music on music storage device 524. The music can be stored as desired by the subscriber. Several techniques for identifying the storage location can be used. For example, the storage location can be sent in the message to base station 1008.

Alternatively, the subscriber can store the storage location in the configuration file described above. In such a case, base station 1008 is configured to retrieve the configuration file to determine the storage location. Depending on the provider of the service, the configuration file can be located within base station 1008 or in some other location. If the configuration file is stored in base station 1008, base station 1008 simply accesses the configuration file.

If the configuration file is located in another location, base station 1008 retrieves the file. To retrieve the proper configuration file, base station 1008 must determine that location. In one embodiment of the present invention, base station 1008 accesses a record associated with an identifier transmitted by general requesting device 1002. For example, base station 1008 can access an account associated with the subscriber. Such an account can be created at the time the subscriber registers to use the music storage service.

Base station 1008 retrieves the configuration file and determines from the information contained therein the location where the subscriber desires the music to be stored. Base station 1008 packages this information in another message that it forwards to the music provider that provides the music the subscriber desires to store. The music provider's identity is provided in the request message sent to base station 1008. The request sent to base station 1008 is similar to requests described above.

The identity of the music provider must be provided to base station 1008. In an embodiment of the present invention, general requesting device 1002 is in communication with music player 522. Such communication can be provided using any means for communicating such information between music player 522 and general requesting device 1002. For example, Bluetooth technology can be used to provide communication between music player 522 and general requesting device 1002. When the subscriber indicates that he or she desires to store music using general requesting device 1002, general requesting device 1002 queries music player 522 for the identity of the music provider providing the music at the time of the subscriber's request. Alternatively, music player 522 detects the subscriber's indication and sends the identity of the music provider to general requesting device 1002. General requesting device 1002 then places the identity of the music provider in the request that it sends to base station 1008.

In another embodiment of the present invention, music player 522 detects the subscriber's indication and itself generates a request through a base station 1008 to obtain and store the music in accordance with the subscriber's request as described above.

Using the identity of the music provider found in the request, base station 1008 contacts the music provider to obtain the music. This can be done as described above. As described above, the music can be downloaded to base station 1008 for forwarding to the location for storing the music specified by the subscriber. Alternatively, base station 1008 can transmit the identity of the storage location to the music provider. The music provider then causes the music to be stored in the location specified by the request. Satisfaction of the music storage request proceeds as described above.

In addition, in the embodiment described in FIG. 10, a third party music provider 302 can offer music provider services as described above.

Figure 10A:
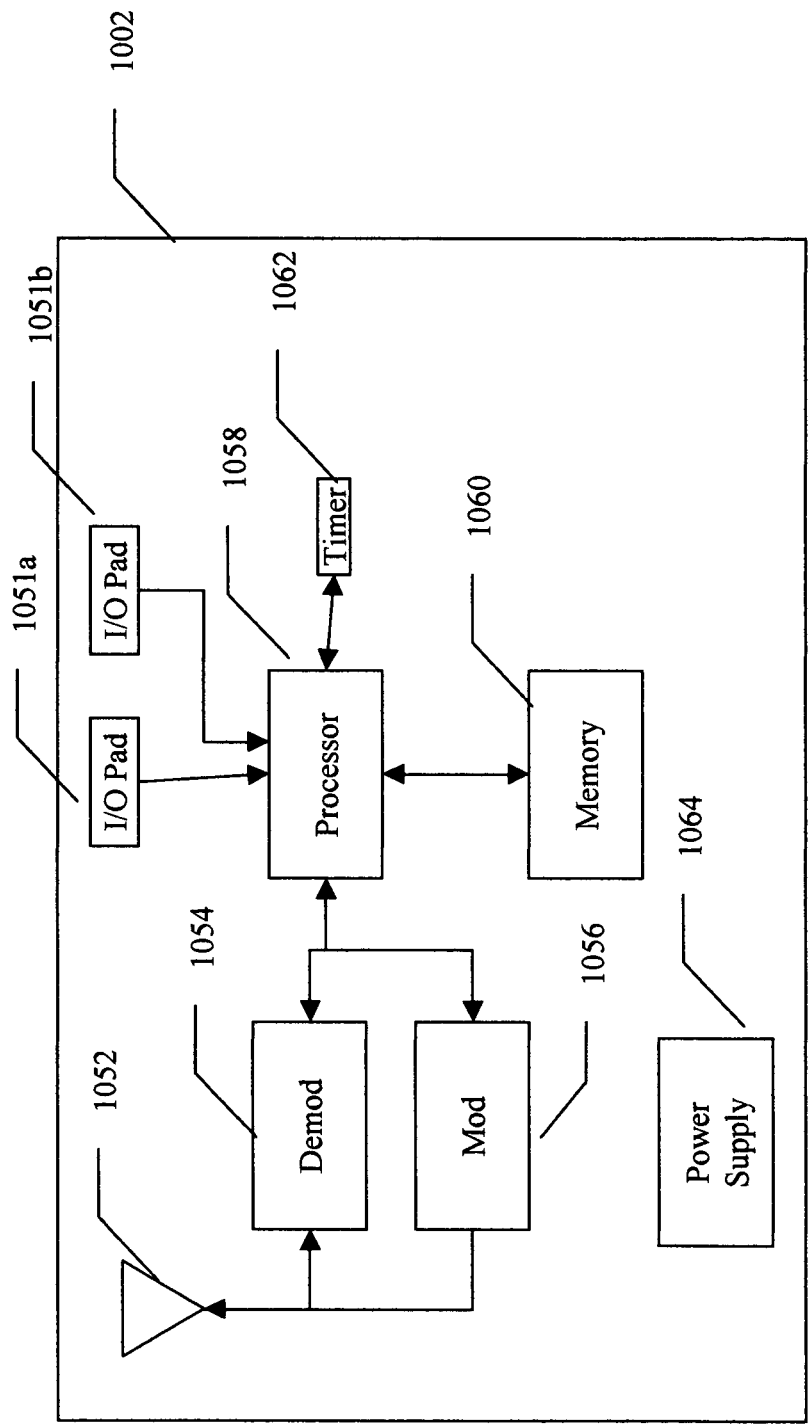
FIG. 10A is a schematic diagram of a general device for storing data according to an embodiment of the present invention.

FIG. 10A is a schematic diagram of a general requesting device 1002 according to an embodiment of the present invention. General requesting device 1002 can be used to request any type of data, including music, that the user desires to store. One or more I/O pads 1051a, 1051b are coupled to buttons 1004a, 1004b to detect a button press. Button debouncing circuitry can be used to eliminate erroneous detection of a single button press as multiple button presses.

Data is received and transmitted through antenna 1052 using a communication protocol such as those identified above. Received data is demodulated in demodulator 1054 and input to a processor 1058. Demodulator 1054 includes any required amplification, filtering, down conversion or other signal processing required to demodulate the received data for input to processor 1058. Modulator 1056 modulates data fro transmission. Modulator 1056 includes any required amplification, filtering, up conversion or other signal processing required to modulate the data to be transmitted.

Processor 1058 can be any controller for controlling operation of general requesting device 1002. For example, processor 1058 can be a microcontroller or a microprocessor configured to perform the operations described herein for the operation of general requesting device 1002. Memory 1060 is available to processor 1058 for temporary or permanent storage. For example, memory 1060 can store user identification information that can be sent to a data provider in response to a user indication to store data, such as by pressing a button on general requesting device 1002. Other information, such as time of the indication and location to store the data, can be including the request. In an embodiment of the present invention, processor 1058 generates the request.

For example, in one embodiment of the present invention, the request is a request for storing a song heard by the user. Processor 1058 generates a request that includes user identification (such as user name or account number), time of user indication to store music and location where the music should be stored. They user's identity can be stored in memory 1060. The time of the indication can be obtained from a clock timer 1062.

A power supply 1064 provides power to components of device 1002. Power supply 1064 can be a batter or a converter from an external supply such as a car cigarette lighter or other power source. Components of device 1002 can be coupled to one another directly or by using a bus structure (not shown).

FIG. 10B is a flow chart for a method of storing data (such as music) using a general device 1002 for storing data according to an embodiment of the present invention. A button indicating a user's desire to store data is detected in step 1080. In step 1082, the data to be stored is determined In step 1084, a request is generated to obtain the data to be stored. In an embodiment of the present invention, the request includes one or more of a user identification, a time of the user's indication to store data and a storage location where data responsive to the request is to be stored. For example, the storage location can be a computer network address, a MIN of a cellular telephone or other device identification. In step 1086, a data provider that can satisfy the request is identified. The identification can be performed as described above by the data source communicating an identity of the data provider that can satisfy the request. In step 1088, the request is sent to the identified data provider. The request is satisfied in step 1090 by the data provider and the data is sent to the storage location included in the request for storage.

The foregoing disclosure of the preferred embodiments of the present invention has been presented for the purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may by varied and still remain within the spirit and scope of the present invention.

What is claimed is:

1. A system for storing music, comprising:
   a storage device to store a song as it is being played to a subscriber;
   a button pressed by the subscriber while listening to the song to indicate a desire to store the song being played to the subscriber, wherein pressing the button causes a timestamp to access a playlist to unambiguously identify the song to be transmitted to a source for obtaining the song being played to the subscriber; and
   a processor to cause the storage device to store only the song being played from its beginning in the storage device when the subscriber is authorized to store the song.

2. The system recited in claim 1, wherein the storage device is located in a vehicle in which the subscriber is located.

3. The system recited in claim 2, wherein the storage device is one of a floppy drive, hard drive, CD-ROM, a DVD and a RAM.

4. The system recited in claim 1, wherein the storage device is located in a telephone and the song is transmitted in one of a ring tone or MP3 format for storage as a ring tone in the telephone.

5. The system recited in claim 4, wherein only a portion of the song is stored in the telephone and the processor causes the storage device to record the song automatically.

6. The system recited in claim 4, wherein the telephone is a cellular telephone.

7. The system recited in claim 1, wherein the subscriber is billed to store the song.

8. The system recited in claim 1, wherein the subscriber is billed to store the song on a per-use basis.

9. The system recited in claim 1, wherein the subscriber is billed to store the song on a periodic basis.

10. The system recited in claim 1, wherein the subscriber prepays to store the song.

11. A method for storing randomly selected music being listened to by a subscriber on demand, comprising:
    receiving data corresponding to the music, wherein the music includes at least one song;
    storing the music data according to a processor as it is received;
    receiving an indication including a timestamp to access a playlist to unambiguously identify the song from a subscriber to store a particular song contained in the music that the subscriber is listening to;
    determining a beginning storage location of the particular song;
    determining whether the subscriber is authorized to store the particular song; and
    storing the particular song from the beginning storage location according to the processor if the subscriber is authorized to store the song in a new storage location.

12. The method recited in claim 11, further comprising detecting the push of a button to receive the indication from the subscriber.

13. The method recited in claim 11, further comprising reformatting the song prior to storing it.

14. The method recited in claim 11, further comprising reformatting the song in accordance with the storage device prior to receiving the music for storage.

15. The method recited in claim 11, further comprising reformatting the song in accordance with the storage device after receiving the music for storage.

16. A method for storing randomly selected music when hearing it, comprising:
    detecting an indication in a processor to store a song while the song is being heard;
    generating a request in the processor to store the music in response to the indication, wherein the request contains a timestamp to access a playlist to unambiguously identify the song being heard;
    transmitting the request to a music provider to obtain song data to store the song from its beginning, wherein the request includes a location of where to store the song data;
    receiving the song data;
    determining whether authorization has been provided for storing the song; and
    storing the song data according to the processor if authorization has been provided for storing the song.

17. The method recited in claim 16, comprising providing a computer network address as the location of where to store the song data.

18. The method recited in claim 16, comprising a cellular telephone MIN as the location of where to store the song data.

19. The method recited in claim 16, comprising billing the subscriber for the song storage.

* * * * *